US012181927B2

(12) United States Patent
Bushnell et al.

(10) Patent No.: US 12,181,927 B2
(45) Date of Patent: Dec. 31, 2024

(54) ELECTRONIC DEVICE HAVING SEALED BUTTON BIOMETRIC SENSING SYSTEM

(71) Applicant: Apple Inc., Cupertino, CA (US)

(72) Inventors: Tyler S. Bushnell, Mountain View, CA (US); James G. Horiuchi, Fresno, CA (US); Michael K. McCord, Mountain View, CA (US); Trevor J. Ness, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/468,579

(22) Filed: Sep. 15, 2023

(65) Prior Publication Data

US 2024/0004435 A1    Jan. 4, 2024

Related U.S. Application Data

(63) Continuation of application No. 17/805,835, filed on Jun. 7, 2022, now Pat. No. 11,797,057, which is a
(Continued)

(51) Int. Cl.
*G06F 1/16*        (2006.01)
*G04B 3/00*        (2006.01)
(Continued)

(52) U.S. Cl.
CPC .......... *G06F 1/1656* (2013.01); *G04B 3/001* (2013.01); *G04G 21/08* (2013.01); *G06F 1/163* (2013.01);
(Continued)

(58) Field of Classification Search
CPC ........ G06F 1/1656; G06F 1/163; G06F 1/169; G06F 3/0202; G06F 3/03547;
(Continued)

(56) References Cited

U.S. PATENT DOCUMENTS 2,866,141 A    12/1958  Frank et al.
4,037,068 A     7/1977  Gaynor
(Continued)

FOREIGN PATENT DOCUMENTS

EP    2720129 A1    4/2014
JP    3034908 U     3/1997
(Continued)

OTHER PUBLICATIONS

U.S. Patent and Trademark Office Decision Granting Institution of Inter Partes Review, *Apple Inc.*, v. *AliveCor, Inc.*, Case No. IPR2023-00948, Jan. 9, 2024.
(Continued)

*Primary Examiner* — Edwin A. Leon
(74) *Attorney, Agent, or Firm* — Dorsey & Whitney LLP

(57) ABSTRACT

A biometric button assembly may be disposed in an opening of an enclosure of an electronic device. The biometric button assembly may include an input member that forms an exterior surface of the button housing and is configured to receive inputs, for example from a user of the electronic device. The biometric button assembly may further include a biometric sensor for detecting the received inputs and transmitting a signal to a processor of the electronic device. The signal may correspond to a biometric characteristic, such as a fingerprint. A flexible conduit may transmit the signal to the processor. A portion of the flexible conduit and a seal may be positioned between the button assembly and the enclosure that prevents contaminants from entering the button housing and the enclosure.

20 Claims, 13 Drawing Sheets

Related U.S. Application Data continuation of application No. 17/094,992, filed on Nov. 11, 2020, now Pat. No. 11,379,011, which is a continuation of application No. 15/627,336, filed on Jun. 19, 2017, now Pat. No. 10,866,619.

(51) Int. Cl.

| | | |
|---|---|---|
| *G04G 21/08* | (2010.01) | |
| *G06F 3/02* | (2006.01) | |
| *G06F 3/0354* | (2013.01) | |
| *G06F 3/044* | (2006.01) | |
| *G06V 40/12* | (2022.01) | |
| *G06V 40/13* | (2022.01) | |

(52) U.S. Cl.
CPC ............ *G06F 1/169* (2013.01); *G06F 3/0202* (2013.01); *G06F 3/03547* (2013.01); *G06F 3/044* (2013.01); *G06V 40/1306* (2022.01); *G06V 40/1359* (2022.01)

(58) Field of Classification Search
CPC ....... G06F 3/044; G06F 3/0362; G04B 3/001; G04G 21/08; G06K 9/0002; G06K 9/0008; H01H 3/122; H01H 9/16; H01H 25/008; H01H 2215/006; H01H 2221/01; H01H 25/06; H01H 2209/006; H01H 2223/002; G06V 40/1359
USPC ......... 368/276, 69, 185–187, 289, 308, 319; 200/4
See application file for complete search history.

(56) References Cited

U.S. PATENT DOCUMENTS

| | | | |
|---|---|---|---|
| 4,258,096 A | 3/1981 | LaMarche | |
| 4,324,956 A | 4/1982 | Sakakino et al. | |
| 4,345,119 A | 8/1982 | Latasiewicz | |
| 4,581,509 A | 4/1986 | Sanford et al. | |
| 4,922,070 A | 5/1990 | Dorinski | |
| 5,258,592 A | 11/1993 | Nishikawa et al. | |
| 5,584,380 A | 12/1996 | Naitou | |
| 5,657,012 A | 8/1997 | Tait | |
| 6,131,464 A | 10/2000 | Pare et al. | |
| 6,344,791 B1 | 2/2002 | Armstrong | |
| 6,355,891 B1 | 3/2002 | Ikunami | |
| 6,525,278 B2 | 2/2003 | Villain et al. | |
| 6,963,039 B1 | 11/2005 | Weng et al. | |
| 7,034,237 B2 | 4/2006 | Ferri et al. | |
| 7,119,289 B2 | 10/2006 | Lacroix | |
| 7,388,167 B2 | 6/2008 | Liao et al. | |
| 7,486,517 B2 | 2/2009 | Aapro et al. | |
| 7,535,799 B2 | 5/2009 | Polany et al. | |
| 8,167,126 B2 | 5/2012 | Stiehl | |
| 8,248,815 B2 | 8/2012 | Yang et al. | |
| 8,263,886 B2 | 9/2012 | Lin et al. | |
| 8,263,889 B2 | 9/2012 | Takahashi et al. | |
| 8,367,958 B2 | 2/2013 | Mittleman et al. | |
| 8,432,368 B2 | 4/2013 | Momeyer et al. | |
| 8,446,713 B2 | 5/2013 | Lai | |
| 8,576,044 B2 | 11/2013 | Chapman | |
| 8,648,829 B2 | 2/2014 | Shahoian et al. | |
| 8,694,793 B2 | 4/2014 | Evans | |
| 8,750,919 B2 | 6/2014 | Hwang | |
| 8,885,856 B2 | 11/2014 | Sacha | |
| 8,922,399 B2 | 12/2014 | Bajaj et al. | |
| 9,058,941 B2 | 6/2015 | Malek et al. | |
| 9,064,654 B2 * | 6/2015 | Whitt, III | G06F 3/0202 |
| 9,064,954 B2 | 6/2015 | Zhu et al. | |
| 9,089,049 B2 | 7/2015 | Perrault et al. | |
| 9,123,483 B2 | 9/2015 | Ferri et al. | |
| 9,449,770 B2 | 9/2016 | Sanford et al. | |
| 9,510,468 B2 | 11/2016 | Schack et al. | |
| 9,620,312 B2 | 4/2017 | Ely et al. | |
| 9,627,163 B2 | 4/2017 | Ely et al. | |
| 9,651,513 B2 | 5/2017 | Dunlap et al. | |
| 9,740,381 B1 | 8/2017 | Chaudhri et al. | |
| 9,871,330 B2 | 1/2018 | Seo et al. | |
| 9,916,942 B2 | 3/2018 | Shedletsky | |
| 9,972,459 B1 | 5/2018 | Hill et al. | |
| 9,973,669 B2 | 5/2018 | Vittu | |
| 9,973,840 B2 | 5/2018 | Wagman et al. | |
| 10,018,966 B2 | 7/2018 | Ely et al. | |
| 10,076,257 B2 | 9/2018 | Lin et al. | |
| 10,102,985 B1 | 10/2018 | Pelletier et al. | |
| 10,133,910 B2 | 11/2018 | Chang et al. | |
| 10,620,828 B2 | 4/2020 | Kim et al. | |
| 10,831,299 B1 | 11/2020 | Lukens et al. | |
| 10,866,619 B1 | 12/2020 | Bushnell et al. | |
| 11,079,812 B1 | 8/2021 | Bushnell et al. | |
| 11,205,548 B2 | 12/2021 | Teplitxky et al. | |
| 11,354,933 B2 * | 6/2022 | Lee | A61B 5/02007 |
| 11,379,011 B1 | 7/2022 | Bushnell et al. | |
| 11,797,057 B2 * | 10/2023 | Bushnell | G06F 3/011 |
| 2004/0082414 A1 | 4/2004 | Knox | |
| 2007/0152959 A1 | 7/2007 | Peters | |
| 2008/0049980 A1 | 2/2008 | Castaneda et al. | |
| 2009/0312051 A1 | 12/2009 | Hansson et al. | |
| 2012/0067711 A1 | 3/2012 | Yang | |
| 2013/0037396 A1 | 2/2013 | Yu | |
| 2013/0087443 A1 | 4/2013 | Kikuchi | |
| 2013/0108082 A1 | 5/2013 | Dave et al. | |
| 2015/0071509 A1 | 3/2015 | Myers | |
| 2015/0199011 A1 | 7/2015 | Fukumoto et al. | |
| 2015/0221460 A1 | 8/2015 | Teplitxky et al. | |
| 2015/0245514 A1 | 8/2015 | Choung et al. | |
| 2016/0058375 A1 | 3/2016 | Rothkopf | |
| 2016/0098016 A1 | 4/2016 | Ely et al. | |
| 2016/0100499 A1 | 4/2016 | Jung et al. | |
| 2016/0313703 A1 | 10/2016 | Ely et al. | |
| 2017/0069443 A1 | 3/2017 | Wang et al. | |
| 2017/0069444 A1 | 3/2017 | Wang et al. | |
| 2017/0069447 A1 | 3/2017 | Wang et al. | |
| 2017/0099742 A1 | 4/2017 | Choi et al. | |
| 2018/0008016 A1 | 1/2018 | Tahmasebzadeh et al. | |
| 2018/0024683 A1 | 1/2018 | Ely et al. | |
| 2022/0300041 A1 | 9/2022 | Bushnell et al. | |

FOREIGN PATENT DOCUMENTS

| | | |
|---|---|---|
| KR | 20080045397 A | 5/2008 |
| KR | 20180062654 A | 6/2018 |

OTHER PUBLICATIONS

U.S. Patent and Trademark Office Decision Granting Institution of Inter Partes Review, *Apple Inc.*, v. *AliveCor, Inc.*, Case No. IPR2023-00949, Jan. 9, 2024.

Complaint for Patent Infringement, *Apple Inc.*, v. *AliveCor, Inc.*, Case No. 4:22-cv-07608-HSG (N.D. Cal. 2022).

Curriculum vitae of Dr. Ronald Berger.

Declaration of Dr. Ronald D. Berger.

U.S. District Courts—National Judicial Caseload Profile (accessed via https://www.uscourts.gov/sites/default/files/fcms_na_distprofile0331.2022.pdf).

Kim , KR 10-2016-0162565 and certified translation thereof.

* cited by examiner

ELECTRONIC DEVICE HAVING SEALED BUTTON BIOMETRIC SENSING SYSTEM

CROSS-REFERENCE TO RELATED APPLICATION(S)

This application is a continuation of U.S. patent application Ser. No. 17/805,835, filed 7 Jun. 2022, and entitled "ELECTRONIC DEVICE HAVING SEALED BUTTON BIOMETRIC SENSING SYSTEM," now U.S. Pat. No. 11,797,057 issued on 24 Oct. 2023, which is a continuation of U.S. patent application Ser. No. 17/094,992, filed 11 Nov. 2020, and entitled "ELECTRONIC DEVICE HAVING SEALED BUTTON BIOMETRIC SENSING SYSTEM," now U.S. Pat. No. 11,379,011, issued 5 Jul. 2022, which is a continuation of U.S. patent application Ser. No. 15/627,336, filed 19 Jun. 2017, entitled "ELECTRONIC DEVICE HAVING SEALED BUTTON BIOMETRIC SENSING SYSTEM," now U.S. Pat. No. 10,866,619, issued 15 Dec. 2020, the disclosures of which are hereby incorporated by reference herein in their entireties.

FIELD

The described embodiments relate generally to electronic devices. More particularly, this disclosure relates to a biometric sensing system in an electronic device. Still more particularly, the present invention relates to a fingerprint sensing system integrated with a button.

BACKGROUND

Many traditional electronics include buttons, keys, or other types of components. Many traditional buttons merely function as switches and are not able to sense a biometric characteristic. Additionally, some traditional buttons may be difficult to seal and may allow for ingress of liquid and other contaminants. The systems and devices described herein are directed to biometric sensing systems that may address these and other issues that are associated with some traditional buttons.

SUMMARY

In one aspect, an electronic device is disclosed, the electronic device comprising: an enclosure having an enclosed volume and an opening formed in a sidewall; a processor positioned in the enclosed volume; a button assembly within the opening, the button assembly comprising: an input member having an input surface; and a biometric sensor positioned below the input member and configured to produce an output signal in response to a touch on the input surface, the output signal corresponding to a biometric characteristic; a seal positioned between a sealing surface of the button assembly and the enclosure; and a flexible conduit coupled to the biometric sensor and configured to transmit the output signal to the processor; wherein: a portion of the flexible conduit is disposed between the sealing surface and the enclosure.

In another aspect, the button assembly further comprises: a tactile dome switch configured to compress in response to a press on the input surface; a plunger positioned below the biometric sensor and above the tactile dome switch, the plunger displacing and compressing the tactile dome switch in response to the press on the input surface; and a retainer defining an aperture housing the plunger; wherein the retainer defines the sealing surface of the button assembly.

In another aspect, the seal includes a gasket and a pressure sensitive adhesive (PSA) layer; and the portion of the flexible conduit is positioned between the gasket and the sealing surface of the button assembly. In another aspect, the seal is overmolded around the portion of the flexible conduit. In another aspect, the flexible conduit passes through an aperture in the seal. In another aspect, the electronic device further comprises a passage extending from the opening to the enclosed volume, wherein the flexible conduit passes through the passage. In another aspect, an enclosure shelf is defined at the bottom of the opening; the passage is formed in the enclosure shelf; and the seal encircles the passage. In another aspect, the portion of the flexible conduit encircles the passage. In another aspect, the biometric sensor is a fingerprint sensor and the biometric characteristic is a fingerprint. In another aspect, the biometric sensor comprises an array of capacitive sensing elements that are configured to detect either or both of the ridges and grooves of a user's finger.

In another aspect, a fingerprint sensing system for a wearable device is disclosed, the fingerprint sensing system comprising: an enclosure defining an enclosed volume and an opening along an exterior surface; a processor disposed in the enclosed volume; a button assembly positioned in the opening and defining an input surface, the button assembly comprising: a fingerprint sensor positioned inward from the input surface; and a retainer positioned inward from the input surface and defining a sealing surface; a seal disposed between the sealing surface of the retainer and a surface of the opening; a passage extending from the opening to the enclosed volume; and a flexible conduit electrically connecting the fingerprint sensor to the processor; wherein: a portion of the flexible conduit is disposed between the sealing surface of the retainer and the surface of the opening.

In another aspect, the flexible conduit extends through the passage. In another aspect, the flexible conduit is coupled to a second flexible conduit that extends through the passage. In another aspect, the fingerprint sensor is further configured to detect a touch. In another aspect, the button assembly further comprises a tactile dome switch disposed inward from the retainer; and the tactile dome switch compresses in response to a press on the input surface.

In one aspect, a watch is disclosed, the watch comprising: an enclosure defining an enclosed volume and an opening formed in a sidewall; a processor disposed in the enclosed volume; a display positioned within the disclosure and operably coupled to the processor; a watchband attached to the enclosure and configured to couple the watch to a user; and a button assembly disposed within the opening, the button assembly comprising: a button housing; an input member with an input surface; a fingerprint sensor positioned below the input member and configured to produce an output signal in response to a touch on the input surface, the output signal corresponding to a fingerprint; and a touch sensor configured to detect the touch.

In another aspect, the watch further comprises a flexible conduit electrically coupled to the fingerprint sensor and configured to transmit the output signal to the processor; and a passage extending from the opening to the enclosed volume; wherein the flexible conduit extends from the opening to the enclosed volume through the passage. In another aspect, the watch further comprises a seal positioned between the button housing and a surface of the opening, and a fastener attaching the button housing to the enclosure and placing the seal in compression. In another aspect, the watch further comprises a compressible layer disposed below the fingerprint sensor, the compressible layer compressing to receive a displacement or a deflection of the input member upon receipt of a user force to the input surface. In another aspect, the watch further comprises an electrical isolation sheet disposed between the button housing and the enclosure.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

Figure 1:
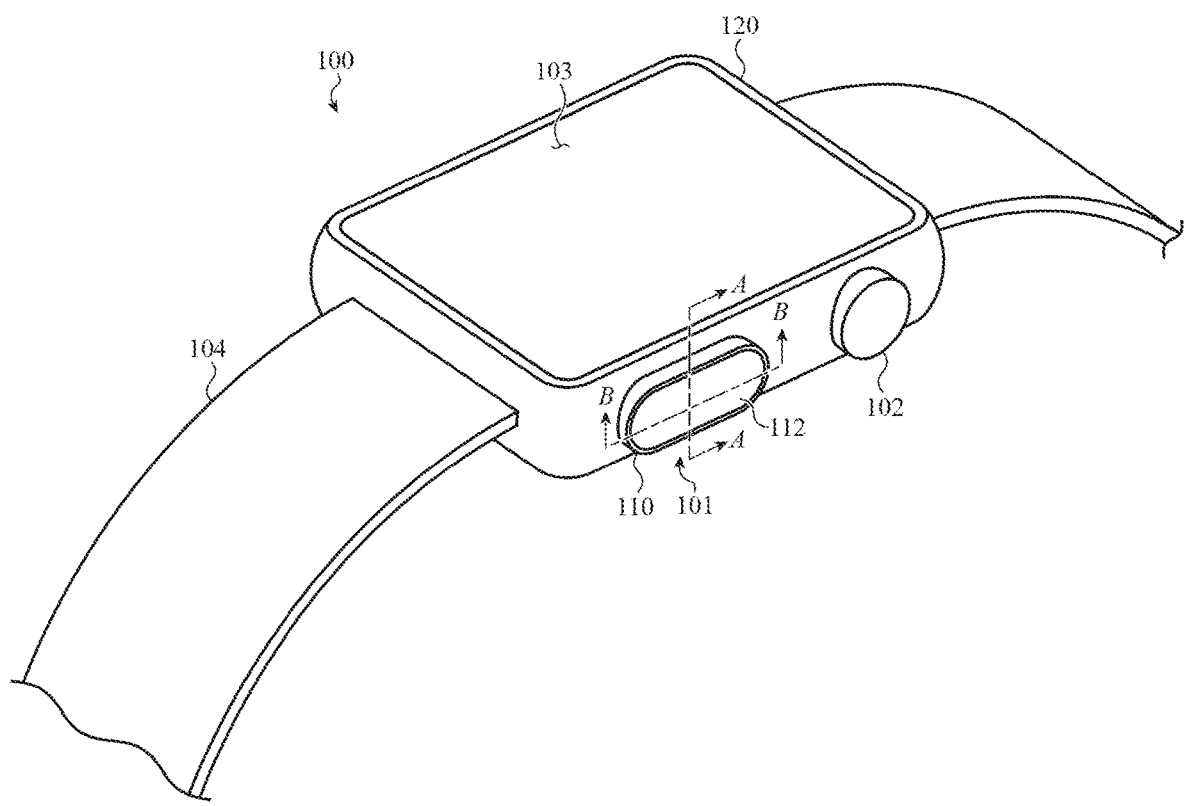
FIG. 1 illustrates a view of one example of an electronic device with a biometric sensing system and button assembly according to various embodiments.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The embodiments disclosed herein are directed to a button with a biometric sensor. For example, the biometric sensor may be a fingerprint sensor. The biometric sensor produces an output signal in response to a user input to the button, such as a user touch. The output signal provides data associated with a biometric characteristic of the user, such as a fingerprint. The output signal is processed by a processor positioned inside the electronic device. A flexible conduit transmits the output signal of the biometric button to the processor of the electronic device. The processor, and other electronic components inside the electronic device, are sensitive to contaminants, such as dust, debris, and liquid. The interface between the button and the electronic device may provide a pathway for entry of contaminants. The routing of the electrical connection between the sensor and the processor may introduce an additional entry path for contaminants into the electronic device. To address these design challenges, a flexible conduit cooperates with a seal fitted between a button of the electronic device. The combined seal and flexible conduit restrict contaminants from entering the electronic device while providing an electrical connection between the biometric sensor and the processor.

Two principal embodiments of a button with a biometric sensor are disclosed. In the first embodiment, a button of an electronic device is movable and includes a biometric sensor and a tactile switch. As the button moves, a tactile switch is compressed and produces a tactile output. The biometric sensor produces an output signal in response to a user touch and corresponds to a biometric characteristic of a user (e.g., a fingerprint). A flexible conduit transmits the sensor data to a processor positioned inside the electronic device. The flexible conduit also cooperates with a seal to restrict ingress of contaminants into the electronic device.

In the second embodiment, a button of an electronic device is stationary and includes both a touch sensor to detect a user input and a biometric sensor. Similar to the first embodiment, the biometric sensor produces an output signal in response to a user touch. A flexible conduit transmits the sensor data to a processor positioned inside the electronic device. A capacitive touch sensor is configured to detect an input to the button input member. The button is sealed by a seal positioned between a button housing and an enclosure of the electronic device.

These and other embodiments are discussed below with reference to FIGS. 1-5. However, those skilled in the art will readily appreciate that the detailed description given herein with respect to these figures is for explanatory purposes only and should not be construed as limiting.

FIG. 1 illustrates an example electronic device 100 that may incorporate a biometric sensing system 101, as described herein. The electronic device 100 includes an enclosure 120 and a biometric button assembly 110 disposed in an opening of the enclosure 120. The biometric button assembly 110 may displace into the enclosure 120 and may include an input member 112 and a biometric sensor.

The biometric sensor may sense a biometric characteristic of the user. The biometric sensor may be implemented in any of several configurations including, for example, a capacitive sensor that can be used to identify a fingerprint. "Biometric sensor," as used herein, may be used to refer to a sensor that can identify or determine a human physical characteristic. The sensed human physical characteristic may vary widely, but may include fingerprint, palm veins, DNA, heart rate, and blood pressure. A capacitive biometric sensor may sense fingerprint characteristics of a user touch that may be used to provide a fingerprint identification of the user. In addition to providing an output that corresponds to a biometric characteristic, the output of the biometric sensor may indicate whether an input (e.g., a touch, a press, or the like) occurs, an approximate location where an input occurs, and/or a measure of the input, e.g., a measurement of absolute capacitance or capacitance change.

The biometric characteristic sensed by the biometric sensor may be used by the device in a number of different ways. For example, the biometric characteristic may be used to identify a user and, thus, may provide a biometric identification for a process or a transaction. The biometric identification may be used to, for example, unlock an electronic device, authorize a transaction, send an alert, and/or enable applications running on the electronic device. A "biometric characteristic" or a "biometric identifier," as used herein, may refer to a human characteristic that is so distinctive and measureable that a particular human individual may be identified. Fingerprints and DNA are example biometric characteristics.

The biometric sensing system 101 may be configured as a button, as depicted in FIG. 1. Other configurations are possible, such as a key of a keyboard or a joystick of a gaming device. The input member 112 of the biometric sensing system 101 may be touched, pressed, or otherwise interacted with by a user. The input member 112 may translate, deflect, bend, or otherwise move a relatively small distance in response to user input.

The biometric sensor produces an output signal in response to a user input to the button, such as a user touch. The output signal provides data associated with a biometric characteristic of the user, such as a fingerprint. The output signal typically requires processing to determine a biometric characteristic, such as a user fingerprint. The processing of the output signal is performed by a processor disposed within the enclosure 120 of the electronic device 100. An electrical connector couples the biometric sensor and the processor to transmit the output signal from the biometric sensor to the processor positioned in the enclosure 120.

It is desirable to seal the enclosure 120 from contaminants to protect internal components that may be sensitive to contaminants. "Contaminants," as used herein, may be used to refer to solids, liquids, and other foreign matter that are not suitable or may be harmful to internal components of the electronic device. Example contaminants include liquids, such as water, and solid matter, such as lint, dust, and food particles. As described herein, the biometric sensing system 101 may be configured to reduce or prevent the ingress of contaminates. In some cases, a seal including for example a gasket and/or adhesive, may be fitted between the biometric sensing system 101 and the opening of the enclosure 120 to restrict the ingress of contaminants into the enclosure 120. To "seal," as used herein, may be used to refer to closing off an opening or a connection. When referenced to a part or component, the term "seal," as used herein, may be used to refer to an element or a group of elements that blocks or inhibits the ingress or entry of foreign debris or contaminants.

The routing of the electrical connection between the sensor and the processor may also be configured to reduce or prevent the ingress of contaminants into the device enclosure. As described herein, a flexible conduit or flexible connector that transmits an output signal from the biometric sensor to the processor may form part of a seal that blocks or inhibits the ingress or entry of foreign debris or contaminants into the enclosure 120.

In the illustrated embodiment, the electronic device 100 is implemented as a wearable computing device (e.g., an electronic watch). The electronic device 100 is depicted as a watch with watchband 104, display 103, and crown 102. The display 103 is positioned at least partially within the enclosure 120 and may be covered with a cover sheet or other transparent protective cover. The watch crown 102 and the biometric button assembly are at least partially positioned within respective openings in the enclosure 120.

The enclosure 120 provides a device structure, defines an internal volume of the electronic device 100, and houses device components. In various embodiments, the enclosure 120 may be constructed from any suitable material, including metals (e.g., aluminum, steel, titanium), polymers, ceramics (e.g., zirconia, glass, sapphire), and the like. In one embodiment, the enclosure 120 is constructed from multiple materials. The enclosure 120 can form an outer surface or partial outer surface and protective case for the internal components of the electronic device 100, and may at least partially surround the display 103. The enclosure 120 can be formed of one or more components operably connected together, such as a front piece and a back piece. Alternatively, the enclosure 120 can be formed of a single piece operably connected to the display 103.

In one embodiment, the enclosure 120 defines an enclosed volume, and may include a passage between the enclosed volume and the opening such that the biometric button assembly 110 and additional components of the electronic device 100 may be physically coupled, for example, by an electrical connector. In contrast to conventional buttons, the biometric button assembly 110 includes a biometric sensor and a flexible conduit to transmit biometric sensor data to a processor of the electronic device 100. In one embodiment, a flexible conduit may pass through the passage. In one embodiment, the flexible conduit cooperates with a seal to restrict the ingress of contaminants through the passage.

The biometric button assembly 110 is positioned or set in an opening of the electronic device 100. The button assembly 110 may be disposed on any of several locations of the electronic device 100. For example, the button assembly 110 may be positioned along a sidewall of an enclosure 120 of an electronic device 100, as depicted in FIG. 1, in which the button assembly 110 is positioned on a sidewall of a watch.

Elements of the button assembly 110 may be integrated with other components of an electronic device. For example, a biometric sensor may be integrated with the rotatable watch crown 102 of a watch. In such an embodiment, a surface of the watch crown may provide an input surface for a biometric sensor of the button assembly, while the watch crown 102 maintains an ability to rotate. In some embodiments, the button assembly 110 may be positioned on a different portion of an electronic device 100, such as on an upper face of an electronic device 100. For example, the button assembly 110 may be disposed adjacent the keyboard of a laptop computer.

The button assembly 110 includes an input member 112 that may be touched, pressed, or otherwise interacted with by a user. The input member 112 may translate, deflect, bend, or otherwise move a relatively small distance in response to user input. The input member 112 may comprise one or more layers. In one embodiment, an outer layer is a cap formed of a durable material such as sapphire. In one embodiment, the button assembly 110 is a sealed button assembly with a biometric sensing capability. Such embodiments are discussed in greater detail below with respect to FIGS. 2-5.

The button assembly 110 may be positioned to extend from the electronic device 100, as depicted in FIG. 1. Other configurations of the mounting of the button assembly 110 are possible. For example, the exterior of the button assembly 110 may be conformal with an adjacent input surface of an electronic device 100, or may be depressed or recessed with respect to an adjacent exterior of an electronic device 100. Furthermore, an exterior upper surface of the button assembly 110 may be planar or non-planar. For example, the exterior upper surface of the button assembly may form a generally convex or concave cross-sectional shape. In one embodiment, the exterior upper surface is splined, meaning, for example, that the input surface extends beyond an active sensor area. Such a spline may be formed for cosmetic or aesthetic reasons. In embodiments in which the button assembly 110 extends from the electronic device 100, the button assembly 110 may present a first geometry for a portion extending from the electronic device, and a second geometry for another portion contained within the enclosure 120 of the electronic device 100.

In embodiments in which the button assembly extends from the electronic device 100, such as shown in FIG. 1, the button assembly 110 may present a first geometry for a portion extending from the electronic device, and a second geometry for another portion contained within the electronic device 100. For example, the button assembly 110 depicted in FIG. 1 presents an oblong or oval geometry for the portion extending from the watch device, yet may have a rectangular geometry, an oblong geometry of reduced dimension, and/or an other-than-oblong geometry within the watch device. The button assembly 110 may be shaped in any of several geometries. For example, the button assembly may be circular, oblong, or rectangular.

As shown in FIG. 1, the electronic device 100 also includes a crown 102 that receives inputs from a user. In one embodiment, the watch crown 102 is configured to rotate about an axis and translate along the axis in response to manipulation. The watch crown 102 may further include a switch such as a dome switch to provide a tactile response to translation of the watch crown. As mentioned previously, elements or components of the biometric button assembly may be integrated with the watch crown 102 such that the watch crown has some or all of the characteristics of the biometric button assemblies described herein. For example, a biometric sensor, such as a fingerprint sensor, may produce an output signal in response to a user touch to a surface of the watch crown, the output signal corresponding to a fingerprint.

As shown in FIG. 1, the electronic device 100 also includes a display 103 that can be implemented with any suitable technology, including, but not limited to liquid crystal display (LCD) technology, light emitting diode (LED) technology, organic light-emitting display (OLED) technology, organic electroluminescence (OEL) technology, or another type of display technology. The display 103 provides a graphical output, for example associated with an operating system, user interface, and/or applications of the electronic device 100. In one embodiment, the display 103 includes one or more sensors and is configured as a touch-sensitive (e.g., single-touch, multi-touch) and/or force-sensitive display to receive inputs from a user. The display 103 is operably coupled to a processor of the electronic device 100 and in various embodiments, a graphical output of the display 103 is responsive to inputs provided to the biometric button assembly.

The wearable electronic device 100 can be permanently or removably attached to the watchband 104. The watchband 104 is configured to couple or attach the watch to a user. The watchband can be made of any suitable material, including, but not limited to, leather, metal, polymer, fabric, and composites of multiple materials. In the illustrated embodiment, the watchband is a wristband that wraps around the user's wrist. The wristband can include an attachment mechanism, such as a bracelet clasp, and magnetic connectors. In other embodiments, the watchband can be elastic or stretchable such that it fits over the hand of the user and does not include an attachment mechanism.

The electronic device 100 can also include one or more internal components (not shown) typical of a computing or electronic device, such as, for example, one or more processors, memory components, network interfaces, and so on. Example device components are discussed in more detail below with respect to FIG. 5. Although a watch is shown in FIG. 1, it should be appreciated that any number of electronic devices may incorporate a biometric button assembly, including (but not limited to): computers, personal digital assistants, media players, laptops, other wearable devices, touch-sensitive devices, keypads, keyboards, and so on.

Figure 2A:
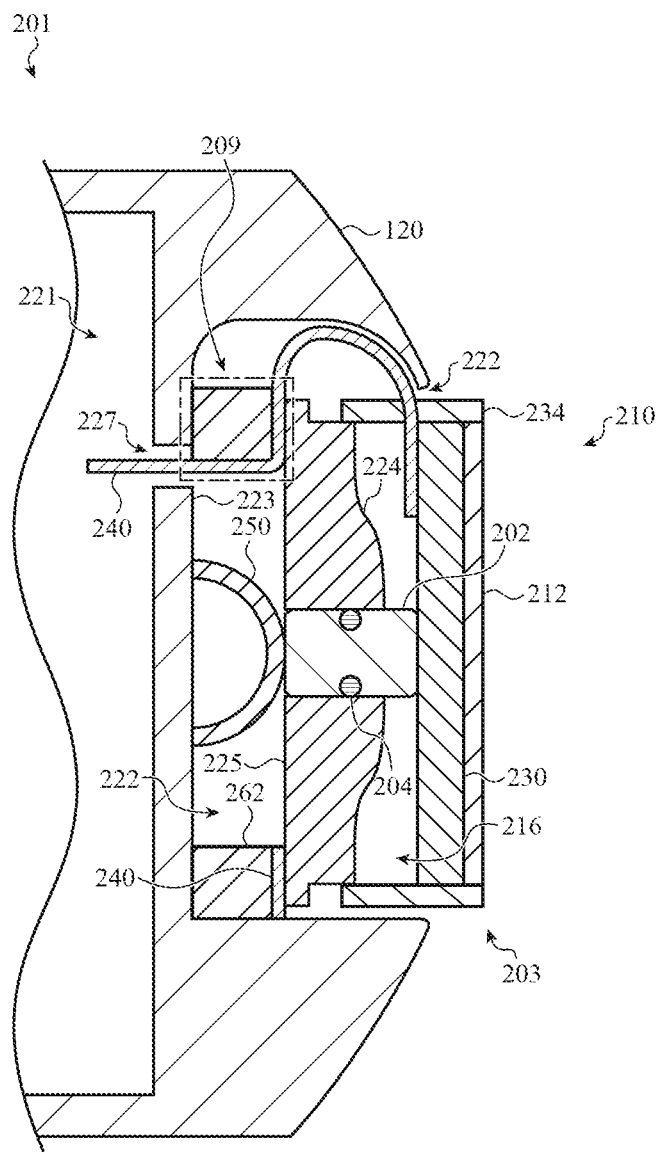
FIG. 2A is a cross-section view of the electronic device of FIG. 1, taken along section A-A in FIG. 1 and showing one embodiment of a biometric sensing system with button assembly in a first or undepressed state.
Figure 2B:
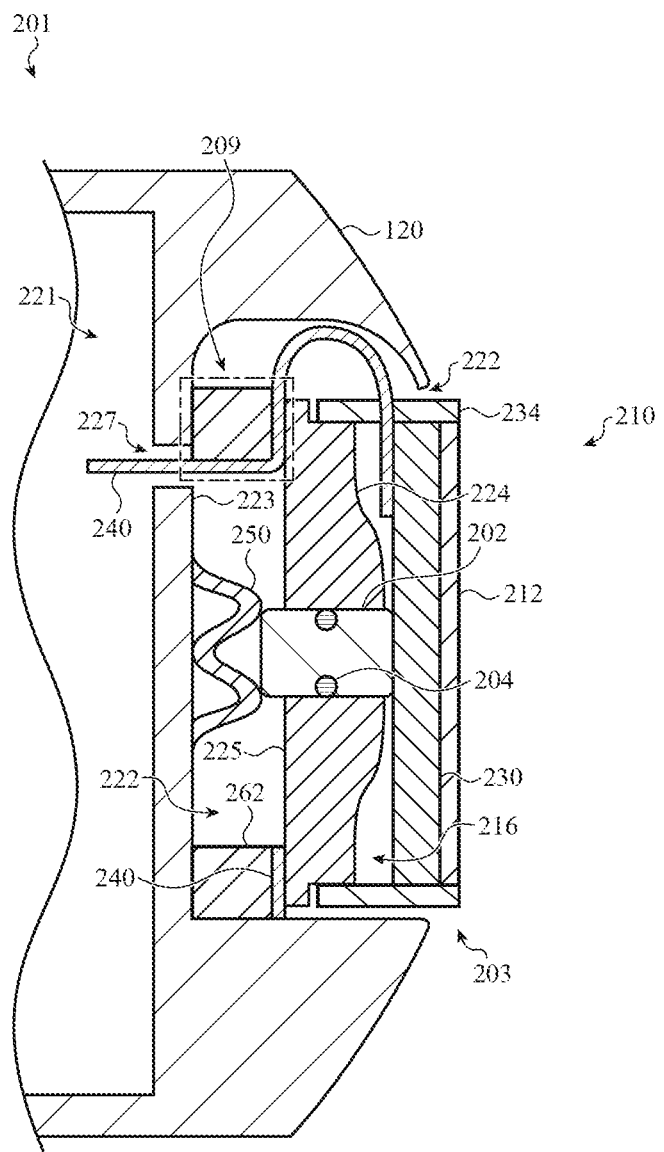
FIG. 2B is a cross-section view of the electronic device of FIG. 2A with button assembly in a second or depressed state.

FIGS. 2A-B are cross-sections of a biometric button assembly disposed in an opening of an electronic device taken along section A-A of FIG. 1. The biometric button assembly 210 is disposed in an opening of an enclosure 120 of an electronic device 100. In FIG. 2A, the biometric button assembly 210 is depicted in a first, undepressed state. In FIG. 2B, the biometric button assembly 210 is depicted in a second, depressed state. Alternate embodiments of the biometric sensing system 201 of FIGS. 2A-B are provided in FIGS. 3A-D, discussed below.

The biometric button assembly 210 is configured to move or displace in response to an input to the input surface 212, e.g. a user touch to the input surface. A button housing 203 of the biometric button assembly 210 displaces into the opening 222 of the enclosure 120 to activate tactile switch 250. The tactile switch 250 provides the user with tactile feedback as to switch operation; for example, whether the switch has been activated. The tactile switch 250 collapses when activated (as depicted in FIG. 2B), and thus provides a tactile response or feedback along the button or other external surface that the switch has been activated.

In the present embodiment, a plunger 202 is used to actuate the tactile switch 250. As shown in FIGS. 2A and 2B, the plunger 202 is positioned below the input surface 212 and translates or displaces with displacement of the input surface 212. The plunger 202 is positioned above the tactile switch 250. The tactile switch 250 receives a force with movement of the plunger 202. Once the plunger 202 displaces to a threshold distance, the tactile switch 250 collapses (compare FIGS. 2A and 2B, where the tactile switch 250 has collapsed in FIG. 2B from un-collapsed configuration in FIG. 2A.)

The tactile switch 250 may produce an electrical signal that may be used to activate or as user input for one of many aspects of the electronic device. For example, activation of the tactical switch 250 may modify a graphical output of the electronic device produced or displayed on the display of the electronic device. That is, the display may provide graphical output that is responsive to the switch 250. For example, the switch 250 may be used to select or accept an option or item, change or adjust a setting, transition a user interface, and/or zoom in or out of the display. As another example, the activation of the switch 250 may be used to control a process (e.g., turn off an alarm), control hardware (e.g., change the brightness or other aspect of a display), or otherwise provide user input to the device 100.

As shown in FIGS. 2A-2B, a biometric sensor 230 is positioned below the input surface 212. Stated another way, the biometric sensor 230 is located inwards from the input surface 212, such that the sensor 230 is positioned within the button assembly and offset inward with respect to the input surface 212. The biometric sensor 230 senses a biometric characteristic of a user, based on user interaction with the input surface 212. For example, the biometric sensor 230 may be a fingerprint sensor of an array of capacitive sensing elements. Upon a user touch to the input surface 212, the biometric sensor 230 senses a change in capacitance or a value of capacitance of the array of capacitive sensing elements. The biometric sensor 230 produces an output signal that includes the sensor measurements. The output signal corresponds to a fingerprint of the user. The output signal may be processed to determine the user fingerprint. The output signal is processed by a processor positioned in an enclosed volume 221 of the electronic device.

A flexible conduit 240 receives the output signal of the biometric sensor 230 and provides the output signal to the processor of the electronic device 100. The flexible conduit 240 may pass through passage 227 between the enclosed volume 221 of the electronic device 100 and interior volume 216 within the button housing 203.

A seal 262 is positioned between a sealing surface 225 of the button assembly 210 and an enclosure shelf 223 of the enclosure 120 of the electronic device 100. The seal 262 restricts ingress of contaminants from entering the enclosed volume 221 by way of the passage 227. The flexible conduit 240 cooperates with the seal 262 to restrict ingress of contaminants from entering the enclosed volume 221 by way of the passage 227. The seal 262 may encircle the passage 227.

In the embodiment of FIGS. 2A-B, the flexible conduit 240 and the seal 262 form a stack that may be referred to as a seal region 209. The flexible conduit 240 includes a portion that is disposed above or on top of the seal 262, the seal 262 disposed or on top of the enclosure shelf 223. The flexible conduit 240 portion stacked on top of the seal 262 is disposed below a sealing surface 225 of the button assembly 210. In the embodiment of FIGS. 2A-B, a lower surface of the retainer 224 is the sealing surface 225 of the button assembly 210. In the present example, both the seal 262 and a portion of the flexible conduit 240 encircle or surround the passage 227. Also, in the present example, the flexible conduit 240 is stacked over the entire seal 262 and the relevant portion of the flexible conduit 240 covers or overlaps substantially all of a sealing surface of the seal 262. This is evident from FIGS. 2A-B, depicting the flexible conduit 240 disposed above the seal 262 on both the left side of the plunger 202 and the right side of the plunger 202. (Also, see FIGS. 3B-C and associated discussion.)

Other configurations of the seal region 209 are possible. For example, a portion of the flexible conduit 240 may be positioned below the seal 262, such that a stack is formed of seal 262 then flexible conduit 240. In such a configuration, the seal 262 would be disposed below the lower surface of the retainer 224. In one embodiment, the seal region 209 is a stack of a first seal, a portion of flexible conduit 240, and then a second seal. In another embodiment, the seal 262 is overmolded about all or a portion of the flexible conduit 240 in contact with the seal 262. In one embodiment, one or more components of the seal region 209 may be under compression when fitted below the sealing surface 225 of the button assembly 210.

The biometric sensor 230 detects inputs received at the input surface 212 and provides an output signal associated with the detected input, for example, to a processor of the electronic device 100. The biometric sensor 230 may include a set of sensing elements. The biometric sensor 230 may be partially or entirely disposed in the interior volume 216 and/or disposed on or near a surface of the button housing 203, such as the input surface 212. In the embodiment depicted in FIGS. 2A-B, the biometric sensor 230 is positioned below the input surface 212.

The biometric sensor 230 may be any type of biometric sensor that provides a signal associated with a biometric characteristic of a user based on user interaction with the input surface 212. For example, the sensor 230 may be a sensor that detects or can be used to identify a fingerprint biometric. The fingerprint biometric may be obtained by any means known in the art, to include, without limitation, a capacitive fingerprint sensor, an ultrasonic fingerprint sensor, and an optical fingerprint sensor. In one embodiment, the biometric sensor 230 is a capacitive system which detects differences in capacitance between portions of a user's finger. A capacitor sensing area may sense or measure such a change in capacitance and output an electrical output signal.

The biometric characteristic, such as a fingerprint, may be used for any of several purposes, such as to provide a user authentication. A user authentication may be used in any of several ways. For example, the user authentication may be used to unlock the electronic device, to authorize a transaction, or to send an alert. A biometric button assembly may be configured, for example, as a power button, a key of a keyboard, a control button (e.g., volume control), a home button, a watch crown, and so on.

The biometric sensor 230 provides or outputs an output signal or a sensor measurement associated with user interaction with the button assembly 210. The output signal may be an electrical output signal. More specifically, the sensor 230 provides or outputs a signal that is triggered or prompted by user interaction with the input surface 212. The input surface 212 may be an input surface configured to receive a user input which may be sensed by the sensor 230, which outputs a signal associated with a biometric of a user. For example, if the force sensor 230 is a capacitive-based sensor, measurements of voltage, capacitance and the like may be sensed by the sensor 230 and output as an electrical output signal.

In one embodiment, the biometric sensor is a capacitive-based sensor array of a set or group of capacitors. In one embodiment, the biometric sensor is a capacitive-based sensor of an array of capacitive sensing elements. In one embodiment, the array, or matrix, of capacitive-based sensors is fine enough to decipher the ridges and grooves of a human fingerprint. Each capacitive sensor element of the array of capacitive sensing elements measures the capacitance between the sensor element and a portion of a user finger near or touching the input surface. The differences in distance to the ridges and channels between ridges of a fingerprint may be used to produce a fingerprint.

The sensor 230 and at least a portion of the flexible conduit 240 are disposed within the interior volume 216. The flexible conduit 240 is engaged with the sensor 230 such that the flexible conduit 240 receives an electrical output signal provided or output by the sensor 230. Stated another way, the flexible conduit 240 is configured to receive the electrical output signal output or transmitted by the sensor 230. The flexible conduit 240 transmits the electrical output signal to a processor of the electronic device 100, the processor of the electronic device 100 disposed within the enclosed volume 221.

The flexible conduit 240 receives the output signal of the biometric sensor 230 and provides the output signal to the processor of the electronic device 100. The flexible conduit 240 may pass through passage 227 between the enclosed volume 221 of the electronic device 100 an interior volume 216 within the button housing 203.

The flexible conduit 240 is configured to receive the electrical output signal output or transmitted by the sensor 230. The flexible conduit 240 transmits the electrical output signal to a processor of the electronic device 100. The processor of the electronic device 100 is disposed within the enclosed volume 221. A proximal or first end of the flexible conduit 240 is disposed below the sensor 230 and within the interior volume 216. A second or distal end of the flexible conduit 240 is disposed below the button assembly 210 and within the enclosed volume 221. A portion of the flexible conduit 240 may pass through a seal region 209 while not compromising the integrity of the seal region 209. Stated another way, the ability of the seal region 209 to prevent or restrict the entry of contaminants into the enclosed volume 221 and/or the interior volume 216 is not degraded or reduced because the flexible conduit 240 passes through, or forms part of, the seal region 219 by way of the passage 227.

A seal 262 is positioned between a sealing surface 225 of the button assembly 210 and an enclosure shelf 223 of the opening 222 of the electronic device 100. The seal restricts ingress of contaminants from entering the enclosed volume 221 by way of the passage 227. The flexible conduit 240 may cooperate with the seal 262 to restrict ingress of contaminants from entering the enclosed volume 221 by way of the passage 227. A portion of the flexible conduit 240 may form a stack with the seal 262. In one embodiment, the seal 262 is disposed on the enclosure shelf 223. In one embodiment, the seal 262 is disposed below the sealing surface 225 of the button assembly 210. In one embodiment, a portion of the flexible conduit 240 is disposed between the seal 262 and the sealing surface 225. In one embodiment, a portion of the flexible conduit 240 is disposed between the seal 262 and the enclosure shelf 223.

The seal 262 may be of a substantially uniform material or a composite of more than one material, and may be manufactured of any known material that may form a water-tight seal. The one or more materials of the seal 262 may comprise any of several materials used to form a seal, including pressure-sensitive adhesives (PSA), heat activated (HAF) substances, or films including HAF silicon, polyimides (PI), rubber, and elastomeric materials. The seal 262 may form, in part or in entirety, a gasket seal, such as a compressible gasket seal.

The flexible conduit 240 extends from the biometric sensor 230 through the seal region 209 and to the processor disposed in the opening 222 by way of the passage 227. The flexible conduit 240 may pass through the seal region 209 in any of several ways, such as entry from a first lateral or first side portion and exiting from a second lateral or second side portion, as depicted in FIGS. 2A-B. In another embodiment, the portion of the flexible conduit that passes through the seal region 209 substantially forms a plane within the seal 262, the plane substantially parallel with the enclosure shelf 223 and/or the input surface 212. Stated another way, a portion of the flexible conduit 240 may form a stacked configuration with the seal 262 to form a seal region 209. In another embodiment, a first flexible conduit 240 terminates within the seal, and a second flexible conduit 240 extends from the seal to the processor, the two flexible connectors 240 in electrical communication.

The flexible conduit 240 may be any conduit configured to carry an electrical current or signals while remaining conformable or flexible upon bending and/or twisting. For example, the flexible conduit may be one or more electrical wires encased in plastic or silicon. The flexible conduit 240 may include a portion that conforms to a geometry of one or more components of the button assembly 210. For example, a portion of the flexible conduit 240 may conform to the interior geometry of the button housing (e.g., see FIG. 3C and associated discussion). The flexible conduit 240 may present a flat although flexible geometry that includes a conductive portion or element that is configured to transfer or communicate electrical signals.

The flexible conduit 240 may be formed from a flexible circuit, flexible flat cable (FFC), or other similar component or assembly. For example, the flexible conduit 240 may be formed from a flexible circuit having conductive traces formed on a flexible substrate. The flexible substrate may be manufactured from a sheet of flexible material include, but not limited to, polyimide, polyether ether ketone (PEEK), and other similar materials. A conductive film or layer may be printed, formed, or otherwise disposed on the substrate and may be patterned to define a conductive path or line. The flexible conduit 240 typically includes multiple conductive paths or lines, each configured to conduct or communicate a separate electrical signal. The flexible conduit 240 may include a terminal or connector that facilitates electrical and structural connection with another component or element.

In some embodiments, the flexible conduit may perform some processing of the data output from the biometric sensor 230 prior to outputting or transmitting the data to the processor of the electronic device 100. For example, the flexible conduit may filter the received data from the biometric sensor 230 such that only activated sensor elements of a multi-sensor biometric sensor 230 are transferred. Such a scenario occurs when the biometric sensor 230 is a matrix of capacitive sensor elements, in which only a fraction of the capacitive sensor elements are activated by a user touch. By only transmitting data associated with activated sensor elements, communication bandwidth is reduced. Also, the processor of the electronic device receives reduced data to process, thereby reducing computation time for fingerprint identification. As described above, the processor may apply the biometric identification for any of several purposes; for example, user identification, device unlocking, and application authorization. In some embodiments, the processor may also instruct the biometric sensor 230 to capture a biometric datum from the user.

The button housing 203 of the biometric button assembly 210 displaces into the opening 222 of the enclosure 120 to activate the tactile switch 250. The enclosure 120 has a sidewall partially defining an enclosed volume 221, an opening 222 formed in the sidewall of the enclosure 120, an enclosure shelf 223 formed at a lower or distal portion of the opening 222, and a passage 227 extending from the opening to the enclosed volume 221.

The passage 227 may be configured to receive or pass a portion of the flexible conduit 240 from the opening 222 to the enclosed volume 221. Any of several components may be positioned in the enclosed volume 221 to include a processor. The passage 227 between the enclosed volume 221 and the opening of the enclosure 120 is configured so that the sensor 230 and components of the electronic device 100 (e.g., a processor) may be operably coupled to facilitate communication or user interaction. For example, a display of the electronic device may be operably coupled to the processor. In the example of FIGS. 2A-B, the flexible conduit 240 is coupled to the biometric sensor 230 and extends through the passage 227 and into the enclosed volume 221. The flexible conduit 240 is illustrated as a flex cable.

The biometric button assembly 210 includes a button housing 203 that forms an exterior structure of the biometric button assembly 210. The button housing 203 defines an interior volume 216. The exterior structure of the biometric button assembly 210 includes input surface 212 and housing wall 234. The input surface 212 extends to a perimeter edge of the biometric button assembly 210. The housing wall 234 extends from the perimeter edge of the biometric button assembly 210 into the opening 222 of the electronic device 100. The input surface 212 and the housing wall 234 define an interior volume 216 of the button assembly 210. The interior volume 216 is adapted to receive any of several other components, to include a sensor 230 and a flexible conduit 240.

As described above, the plunger 202, positioned below the input surface 212, displaces with displacement of the input surface 212. The plunger 202 is positioned above the tactile switch 250 and may actuate the tactile switch 250 when the input surface 212 is displaced. As shown in FIGS. 2A-2B.

The plunger 202 is configured to engage a retainer 224 within an axial aperture of a central portion of retainer 224. The retainer 224 is axially aligned with the plunger 202. The retainer 224 is at least partially disposed in the interior volume 216 of the button housing 203. The retainer 224 holds the plunger 202 in a stable vertical position and allows an axial displacement of the plunger 202 such that a tactile dome switch 250 may be activated. The retainer 224 may be a manufactured of any rigid or semi-rigid material, to include metals and hardened plastics. A plunger O-ring 204 is fitted around a central portion of the plunger 202. The plunger 202 displaces upon a user input to the input surface 212, as shown by comparing FIG. 2A, in which the plunger is not displaced, and FIG. 2B, in which the plunger is displaced.

In the embodiment of FIGS. 2A-B, the retainer 224 includes a lower surface that forms a sealing surface 225 of the button assembly 210. Specifically, a lower surface of the retainer 224 may form a sealing surface 225 of the button assembly 210, the sealing surface 225 engaged with or contacting either the seal 262 or a portion of the flexible conduit 240.

The button housing 203 may translate or displace within the opening 222 by slightly displacing the plunger 202 against the tactile switch 250. For example, with respect to FIGS. 2A-B, the button housing 203 translates or displaces to the left-right against the plunger 202 in response to a user input. Tactile dome switch 250 activates upon movement or displacement of the plunger 202. Once the plunger 202 displaces to a threshold distance, the tactile switch 250 collapses. FIG. 2A depicts the tactile switch 250 in an unactivated or uncollapsed state. FIG. 2B depicts the tactile switch 250 in an activated or collapsed state.

The opening 222 extends to an enclosure shelf 223 adapted to receive the button housing 203 and the switch 250. The switch 250 may be incorporated or assembled to a printed circuit board (PCB) that is affixed to the enclosure shelf 223 by an adhesive or fastener. The PCB may include electrical terminals and electrical routing elements for electrically coupling the switch 250 with other elements or components of the device.

The tactile dome switch 250 may be any type of switch known to those skilled in the art, to include a metal or rubber dome switch. A tactile dome switch compresses in response to an applied force. Upon reaching a threshold level of compression, the tactile dome switch 250 buckles and makes an electrical contact. The electrical contact closes the switch, which may be transmitted as an electrical signal or detected as an electrical activation. An electrical connector is connected to the tactile dome switch 250 to receive and transfer the output from the tactile dome switch 250. As previously discussed, components of the electronic device 100, such as the display, may respond to an activation of the tactile dome switch 250.

In one embodiment, the biometric sensing system 201 may be configured to activate in response to an input force to an input member of the biometric button assembly 210 which is of negligible magnitude or to the near proximity of a user. Such an operational mode may be enabled by any of several types of proximity sensors located on or adjacent to the input member of the button assembly 210. For example, when an object, e.g., a user finger, approaches the input surface 212 of the button assembly 210, the object may be detected by a proximity sensor, resulting in a signal used to activate the biometric sensing system 201. In one embodiment, the sensor 230 may nominally remain off until the proximity sensor is activated. Such a configuration allows power to be conserved, for example, in that the sensor 230 is only activated when a user is adjacent the proximity sensor and/or adjacent the button assembly 210. Sample proximity sensors include capacitive sensors, optical sensors, Hall Effect sensors, ultrasonic sensors, and so on. In some embodiments, the proximity sensor may be a touch sensor.

In some embodiments, the proximity sensor may be fitted to or incorporated into the housing wall 234, to include a housing wall 234 configured as a trim surface. In one embodiment, the housing wall 234 is a conductive material. In one embodiment, the proximity sensor is disposed within the interior volume 216 and/or is embedded in the input surface 212. The button assembly 210 is at least partially disposed in an opening 222 of an electronic device 100. As shown in FIGS. 2A-B, the button assembly 210 may be positioned to protrude from a surface of the enclosure 220.

The physical profile of the button assembly 210 may be of any of several configurations, to include substantially planar or flat, convex, and concave. In one embodiment, the input surface is an input member, such as a touch screen. The input surface 212 extends to a perimeter edge of the button assembly 210. A housing wall 234 extends from the perimeter edge of the button assembly 210 into the opening 222. Although the housing wall 234 is shown in FIGS. 2A-B as a straight cross-section, other geometries are possible. For example, the housing wall 234 may form a straight cross-section with a cut-out to retain an O-ring seal. In one embodiment, the housing wall 234 is a trim surface that is matched to the look and/or feel of the enclosure 220. For example, the housing wall 234 may be manufactured of the same material (e.g., a metal alloy) as the enclosure 220, present the same color as the enclosure 220, and/or present the same texture (e.g. roughness) as the enclosure 220. In some embodiments, the housing wall 234 may be manufactured of a complementary material to the enclosure 220, or manufactured of a material not the same as the enclosure 220.

Figure 3A:
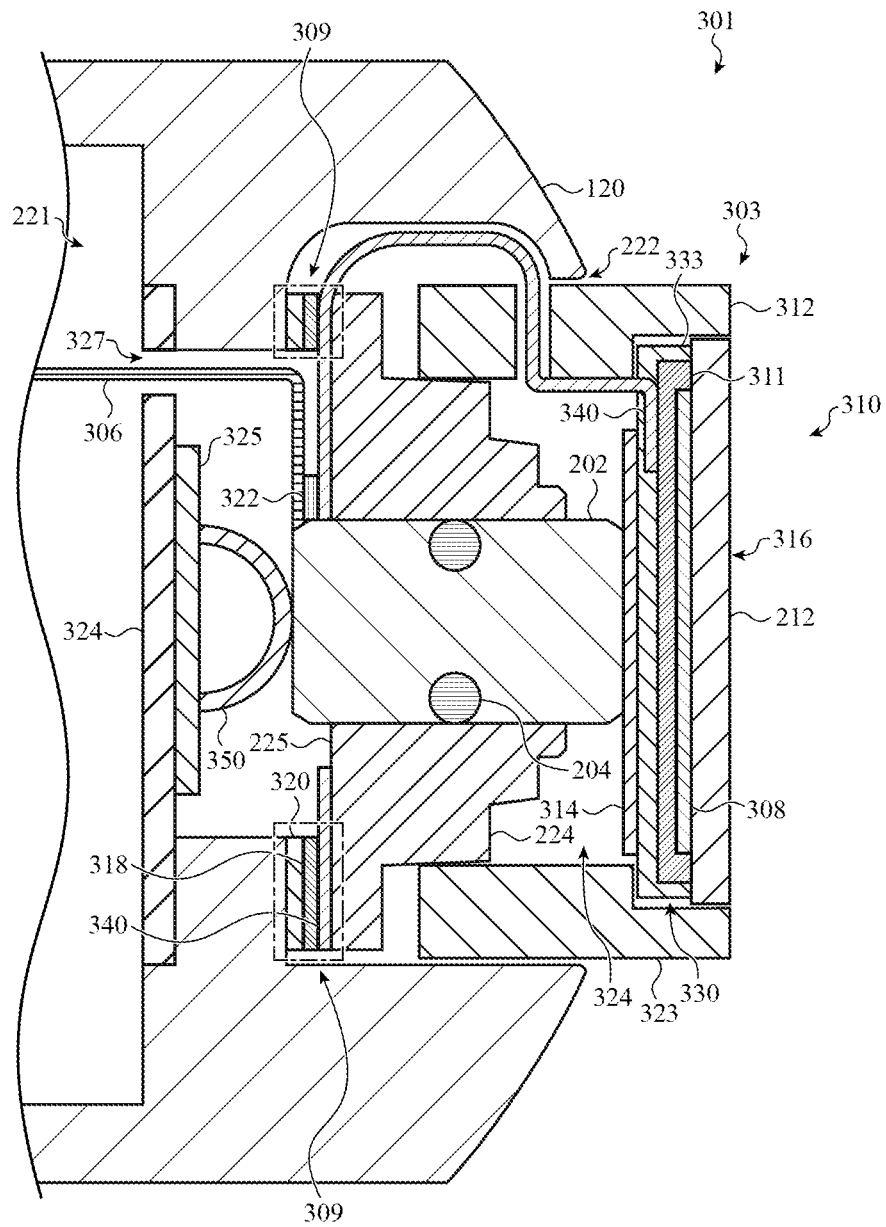
FIG. 3A is a cross-section view of the electronic device of FIG. 1, taken along section A-A in FIG. 1 and showing another embodiment of a biometric sensing system.

FIG. 3A is a cross-section of a biometric button assembly disposed in an opening of an electronic device taken along section A-A of FIG. 1. The biometric button assembly 310 is disposed in an opening of an enclosure 120 of an electronic device 100. The biometric button assembly 310 is depicted in a first, undepressed state. The biometric button assembly 310 may operate in a second, depressed state (not shown). The embodiment of the biometric button assembly 310 of FIG. 3A is an alternative design of the embodiment of the biometric button assembly 210 of FIGS. 2A-B.

Generally, the biometric button assembly 310 is configured to move or displace in response to an input to the input surface 212, e.g. a user touch to the input surface. A button housing 303 of the biometric button assembly 310 displaces into the opening 222 of the enclosure 120 to activate tactile switch 350. The tactile switch 350 provides the user with tactile feedback as to switch operation; for example, whether the switch has activated. The tactile switch 350 collapses when activated, and thus provides a tactile response or a sense of touch to the user that the switch has been activated.

The biometric button assembly 310 defines an input surface 212 on the exterior of the biometric button assembly 310 for receiving inputs, such as inputs from users (e.g., touches, presses, and the like). Inputs may include presses, touches, or other interactions between a user and the input surface 212. The button assembly 310 includes a cover glass 316, such as sapphire. The cover glass 316 may be an input member with input surface 212, as discussed previously with respect to the embodiment of FIGS. 2A-B. A biometric sensor 330 is positioned below the input surface 212. Stated another way, the biometric sensor 330 is located inwards from the input surface 212, such that the sensor 330 is positioned within the button assembly and offset inward with respect to the input surface 212. The biometric sensor 330 detects inputs received on the input surface 212. A flexible conduit 340 receives an output signal from the sensor 330 and transmits the output signal to a processor of the electronic device 100.

The upper portion of the button assembly 310 includes a stack of several components. The stack of components will be described from the exterior of the button assembly 310 inward. An input surface 212 defines an upper input surface of the button assembly 310. The input surface 212 is formed on the upper surface of the cover glass 316. Biometric sensor 330 is disposed below cover glass 316. Biometric sensor 330 is disposed within an upper portion of encapsulant 333. The encapsulant 333 is disposed above an upper stiffener 314. Lastly, the upper stiffener 314 is disposed above and is connected to the plunger 202. In one embodiment, the encapsulant is overmolded around the sensor die 311.

Biometric sensor 330 is depicted in FIG. 3A to highlight the sensor 330 component elements of sensing elements 308 and sensor die 311. The sensor 330 may include one or more of the biometric sensor types discussed above, to include capacitive, optical, and ultrasonic. The sensing elements 308 are the active sensing components of a particular biometric sensor 330. For example, if the biometric sensor 330 is a multi-capacitor sensor, the sensing elements 308 are the capacitive plate elements that, together, form a matrix of capacitive sensing elements. The sensor die 311 is shaped or configured to snuggly fit or securely retain the sensing elements 308. In one embodiment, the sensor die 311 forms an interference fit with the sensing elements 308.

The sensor die 311 retains the sensing elements 308 in a substantially planar configuration such that sensing of a user input may be performed. For example, if the sensor 330 was a self-capacitive system, upon a user touch to the input surface 212, a change in capacitance between one or more of the sensing elements 308 and the user finger would occur. One or more of the sensing elements 308 would sense or measure such a change in capacitance and output an electrical output signal, as discussed above. The measure of capacitance varies with the distance between the sensing area and the user finger. If a fine array of capacitive sensors were positioned within the sensor die to form the sensing elements 308, the differences in distance to a ridge of a fingerprint and channels between ridges of a fingerprint could be detected. A collection of such capacitance measures allows a fingerprint to be constructed.

Sensor die 311 is disposed within encapsulant 333. The encapsulant 333 encloses and protects the sensor die 311 and the sensing elements 308. A perimeter of the encapsulant 333 may engage a lower surface of the cover glass 316, thereby enclosing or sealing the sensor 330. The encapsulant 333 may protect the sensor 330 from, among other things, humidity, temperature changes, vibration, and mechanical shock such as caused by dropping of the electronic device 100. The encapsulant 333 may be any encapsulant or electrical potting compound known to those skilled in the art, to include polyurethanes, epoxies, silicones, and other polymers.

Upper stiffener 314 is disposed between the encapsulant 312 and the plunger 202. Stated another way, the upper stiffener is disposed below a lower surface of the encapsulant 333 and disposed above an upper surface of the plunger 202. The upper stiffener 314 is formed of a rigid material, such as metal or hardened plastic. The upper stiffener 314 helps to distribute the contact force and/or contact load applied to the sensor 330 during operation of the plunger 202.

The flexible conduit 340 receives the output signal from the biometric sensor 330 and transmits the output signal to a processor within the electronic device. A first or proximal end of the flexible conduit 340 is engaged with at least a portion of the encapsulant 333. In the embodiment of FIG. 3A, the proximal end of the flexible conduit 340 is disposed within a lower portion of the encapsulant 333. In such a configuration, the proximal end of the flexible conduit 340 remains fixed and in a predictable distance and orientation with respect to the sensor 330.

The flexible conduit 340 receives an electrical output signal generated and output by the sensor 330 and transmits the electrical output signal to a processor of the electronic device 100. The flexible conduit 340 runs from below the sensor 330, along an edge of the button assembly 310, to below the button housing 303. At the distal end of the flexible conduit 340, an electrical connection connects the flexible conduit 340 with a system connector 306. The system connector 306 receives data or electrical output signals from the system connector 306 and outputs the electrical output signals to a processor of the electronic device 100.

The second or distal end of the flexible conduit 340 connects with the system connector 306 through a hot bar connector 322. The hot bar connector 322 provides an electrical connection between the flexible conduit 340 and the system connector 306. The phrase "hot bar" means a connection obtained through a pulsed heat thermode soldering technique resulting in a permanent electro-mechanical connection. The hot bar connector 322 may be a hot bar connection or any other connection known to those skilled in the art that provides a reliable electrical connection.

In the embodiment of FIG. 3A, the retainer 224 is of stepped design, with a lowest step providing a stop to displacement of the button housing 303. Other configurations of the retainer 224 are possible, to include a sloped design (such as that of FIGS. 2A-B.) The retainer 224 lower surface forms a sealing surface 225 for the button assembly 310.

The retainer 224 is disposed on a portion of the flexible conduit 340. Stated another way, the sealing surface 225 of the retainer 224 is disposed on a portion of the flexible conduit 340. A portion of the flexible conduit 340 disposed below the sealing surface 225 of the retainer is disposed on a face seal 318. The face seal 318 is in turn disposed on a static seal 320. In some embodiments, only one of face seal 318 and static seal 320 are provided. For example, the sealing surface 225 of the retainer is disposed on a portion of the flexible conduit 340, a portion of the flexible conduit 340 in turn disposed or either the face seal 318 or the static seal. In another embodiment, the stack of seals and flexible conduit are in a different sequence. For example, from sealing surface 225 of the retainer 224 toward the enclosed volume, the stack may be face seal 318, flexible conduit 340, then static seal 320.

Alternatively, the stacked sequence may be face seal 318, static seal 320, then flexible conduit 340, or any sequence combination of face seal 318, static seal 320, and flexible conduit 340. Additionally, one or more adhesives may be used to bond the above layers together. For example, an adhesive may be fitted between face seal 318 and static seal 320 or between other combinations of layers. In one embodiment, the face seal 318 is a gasket seal. The face seal 318 may be a pressure-sensitive adhesive (PSA). In one embodiment, the static seal 320 is a gasket seal. The static seal 320 may be a pressure-sensitive adhesive (PSA).

In the present example, the face seal 318, static seal 320, and a portion of the flexible conduit 340 encircle or surround the passage 327. Also, in the present example, the flexible conduit 340 is stacked over the face seal 318 and the static seal 320, and the relevant portion of the flexible conduit 340 covers or overlaps substantially all of a sealing surface of the face seal 318 and the static seal 320.

In one embodiment, a portion of the flexible conduit 340 is fitted within a layer of seals and/or PSA to form a seal region 309. For example, PSA may be applied to both an upper and a lower surface of the distal end of the flexible conduit 340, such that the upper PSA portion connects with the sealing surface 225 of the retainer 224 and the lower PSA portion connects with the enclosure shelf of the opening 222. In another example, a gasket seal (such as face seal 318) may further be applied below the lower PSA portion, such that a sandwich, from outside the button assembly inwards, is formed of PSA, flexible conduit 340, PSA, and then the gasket seal. In one embodiment, one or more seals are insert molded around the flexible conduit 340. In one embodiment, one or more seals are face sealed against the flexible conduit 340. In one embodiment, one or more seals are adhered to the flexible conduit 340 using pressure-sensitive adhesives. In one embodiment, all or part of the seal region is overmolded around all or part of the seal region that passes into or through the seal region.

In one embodiment, the one or more parts fitted between the sealing surface 225 of the button assembly 310, such as the lower surface of the retainer 224, and the enclosure shelf may be termed a seal region 309. The seal region restricts entry or ingress of contaminants into the enclosed volume 221 by way of passage 327. The components which form the seal region 309 may be a substantially parallel stack of components, as described above. In other embodiments, the seal region may be any one or more components that restrict entry or ingress of contaminants into the enclosed volume 221. As shown in FIGS. 3A and 3D, the seal region 309, including the face seal 318, static seal 320, and relevant portion of the flexible conduit 340, encircles or surrounds the passage 327 to prevent or reduce the ingress of contaminants into the enclosed volume 221 of the enclosure 120. The seal region 309 including the various components also surrounds the tactile dome 350 and other electronic or electrical components of the switch, which may protect those components from contaminants, as well.

The button assembly 310 includes a plunger 202, the plunger 202 in turn connected to a switch 350. The plunger 202 is axially aligned within the button assembly 310. With movement of the button assembly 310, the plunger 202 translates or displaces, resulting in activation of the switch 350. The plunger is fitted in a central groove to receive a plunger O-ring 204. The plunger O-ring 204 is configured to engage with a retainer 224, discussed with regard to FIGS. 2A-B. An upper portion of the plunger 202 may be attached to a lower portion of the upper stiffener 314. In one embodiment, the upper portion of the plunger 202 is attached to the lower portion of the upper stiffener 314 with an adhesive or other attachment device or mechanism.

The switch 350 is disposed on a printed circuit board (PCB) 325, which is in turn disposed on a bracket 324. The bracket 324 is a rigid component that provides structural support to the PCB 325 and to the switch 350. The PCB 325 includes electrical connections to receive electrical activation signals from the switch 350, and may hold other electrical components. The bracket 324 may be disposed on a shelf within the opening 222 of the electronic device 100.

Figure 3B:
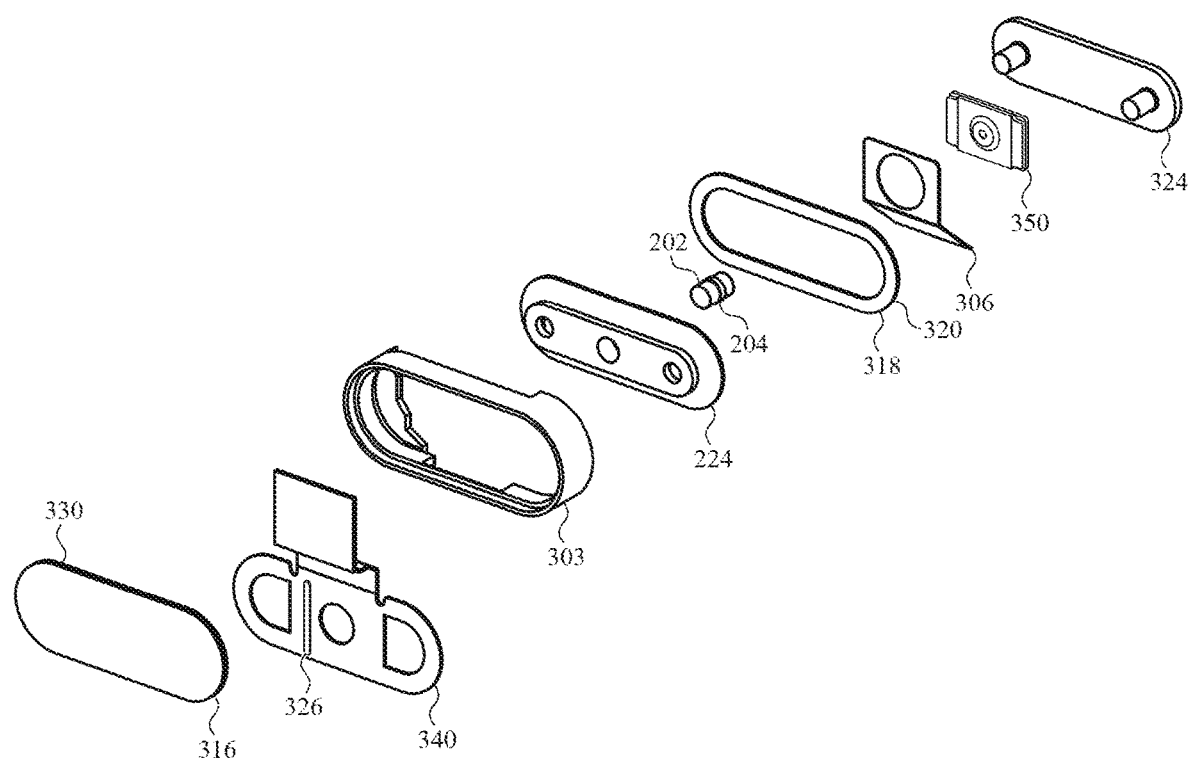
FIG. 3B is an exploded view of portions of the embodiment of a biometric sensing system of FIG. 3A.
Figure 3C:
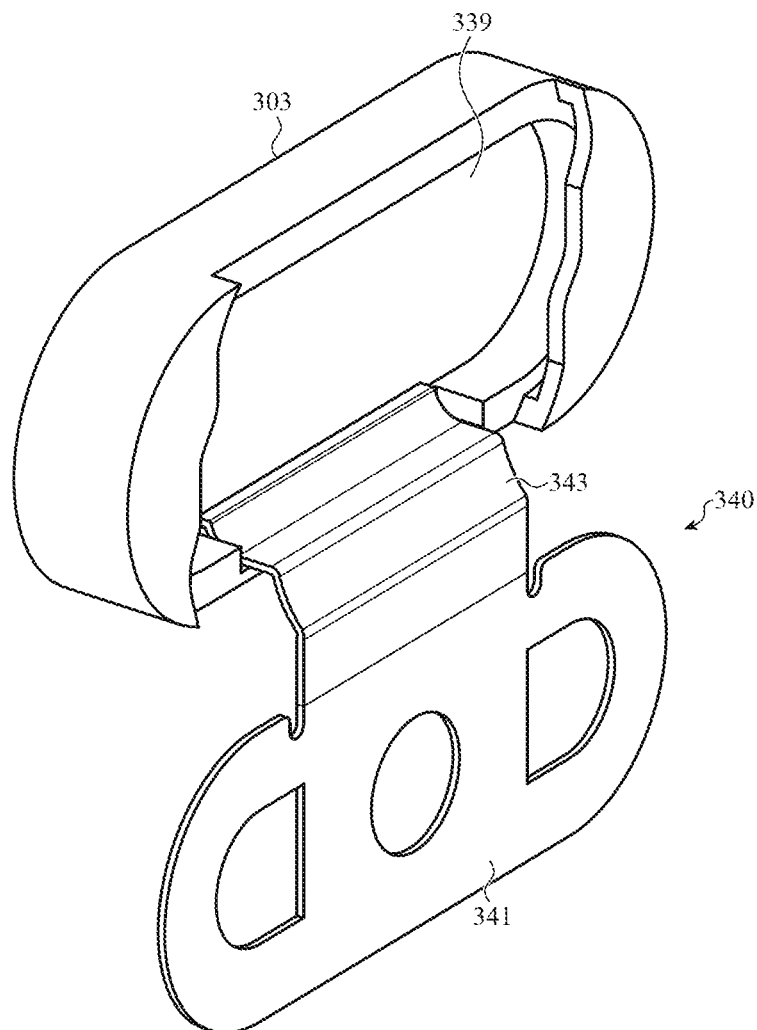
FIG. 3C is another view of portions of the embodiment of a biometric sensing system of FIG. 3A.
Figure 3D:
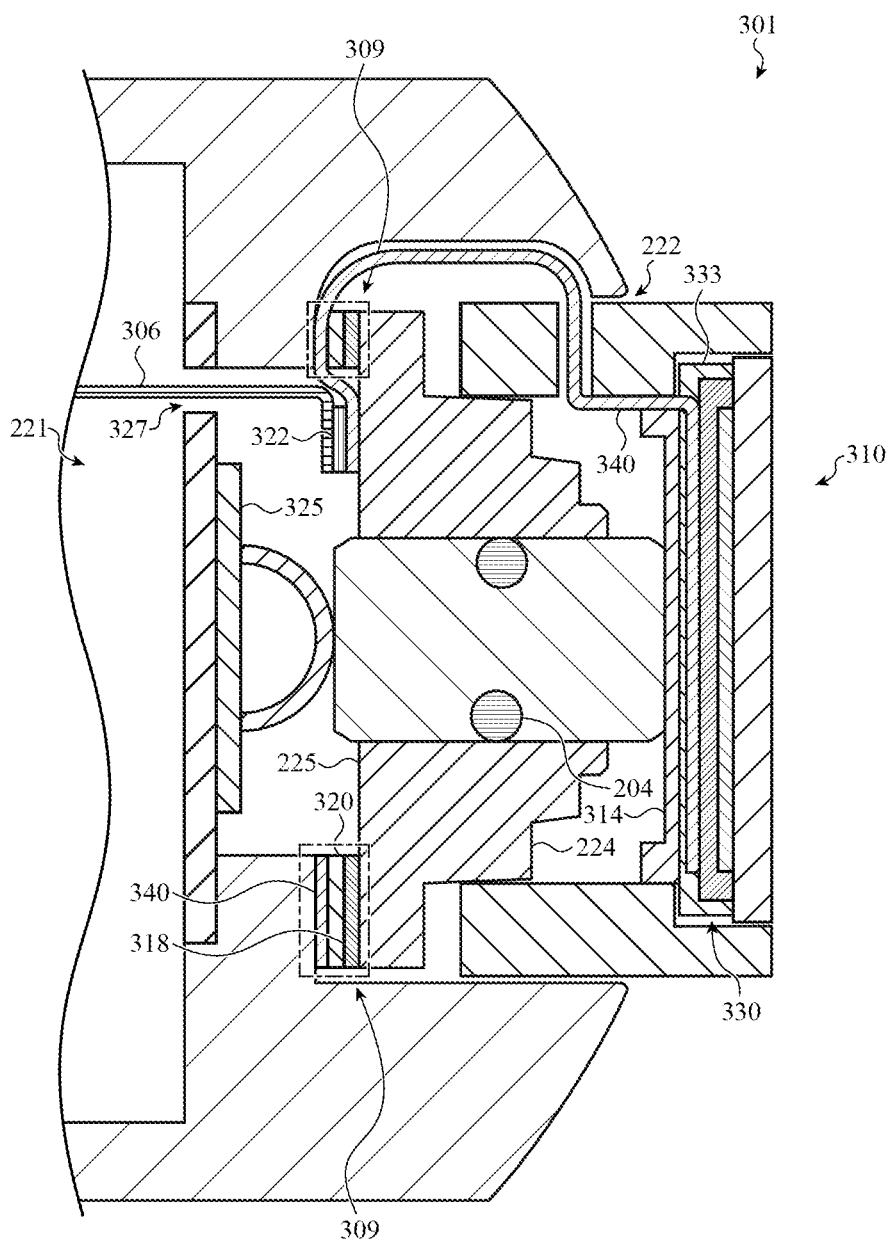
FIG. 3D is a cross-section view of the electronic device of FIG. 1, taken along section A-A in FIG. 1 and showing another embodiment of a biometric sensing system.

FIG. 3B is an exploded view of portions of the embodiment of a biometric sensing system 301 of FIG. 3A. FIG. 3C is a close-up of two components of FIG. 3B fitted together. In FIG. 3B, nine portions of the biometric sensing system 301 are shown. Generally, the components of the biometric sensing system 301 interlock. The stack of components will be described in a descending direction from the exterior of the button assembly downward, and from left to right in FIG. 3B.

The cover glass 316 fits with or is conformal with an assembly of the encapsulated sensor die, sensor elements, and the flexible conduit 340. The encapsulated sensor die and the sensing elements are depicted as assembled to the partially encapsulated flexible conduit 340, and not depicted separately. Note that the portion of the flexible conduit 340 that is not encapsulated is the portion that runs along an outer portion of the button housing 303 and connects with the system connector 306. A system connector 306 may include another separate flexible circuit or conduit that is electrically coupled to the flexible conduit. The system interconnect 306 may include a set of interconnects, such as circular interconnects or linear interconnects and may provide an electrical connection between the flexible conduit 340 and the system connector 306. For example, the system interconnect may be an electrical connector, such as an encased wire. The system interconnect 306 may replace or supplement the hot bar connector 322. The assembly of encapsulated sensor die, sensing elements, and flexible conduit 340 fit within button housing 303 and rest on a shelf of the button housing 303, as shown in FIGS. 3A-B.

FIG. 3C depicts an assembly of the flexible conduit 340 fitted to the button housing 303. The flexible conduit 340 may include an upper portion 339 that is connected to the sensor 330. (See FIG. 3A.) A second or sealing portion 341 of the flexible conduit 340 is coupled to the first portion 339 by a folded portion 343. The sealing portion 341 may be generally flat and may interface with the seal to form a seal region, as described above with respect to FIG. 3A. One or more openings or apertures formed in the sealing portion 341 may be configured to encircle the plunger, the passage, or other feature or element of the button assembly or device. As described previously, by encircling or surrounding the passage or various components, the flexible conduit 340, specifically the sealing portion 341, may prevent or reduce ingress of contaminates for those components or regions of the device. A folded conduit portion 343 connects first conduit end 339 and second conduit end 341 and may be configured to bend, flex, or fold in accordance with the operation of the switch. The folded conduit portion 343 may be of smaller width then the width of one or both of first conduit end 339 and second conduit end 341. The folded conduit portion 343 may be configured with multiple folds, so as to form an accordion configuration, as depicted in FIG. 3C.

Returning to FIG. 3B, plunger 202, with plunger O-ring seal 204, fit within a central aperture of retainer 224. After folding the flexible conduit 340 such that second conduit end 341 is aligned and fitted below lower surface of retainer 224, face seal 318 fits below second conduit end 341. Static seal 320 is depicted already attached to face seal 318. Retainer 224 is depicted with a central hole to allow passage of plunger 202 and switch 350. Lastly, bracket 324 is shown to form a lower component of the biometric sensing system 301. Note further that lower bracket 324 is depicted with two fasteners that engage with two outer holes in retainer 224.

FIG. 3D is a sample cross-section view of the electronic device 100 of FIG. 1, taken along section A-A in FIG. 1 and showing another embodiment of a biometric sensing system 301. The embodiment of FIG. 3D is similar to the embodiment of FIGS. 3A-B except that the configurations of some components are different. Specifically, the flexible conduit 340 and associated connections, the configuration of the stiffener 314, and the seal region 309 are different.

Stiffener 314 is shown with additional thickness at outer areas. The additional structural thickness will increase the rigidity of the stiffener, such that a relatively less degree of rotational movement may occur during vertical displacement of the button housing 310.

The upper positioning of the flexible conduit 340 is extended in the embodiment of FIG. 3D relative to that of FIGS. 3A-B. The first or proximal end of the flexible conduit 340 extends across substantially the entire horizontal portion of the encapsulant 333. This configuration provides more overlapping between the flexible conduit 340 and the sensor 330. Such increased overlapping area may allow additional electrical output signal processing to occur at the proximal end of the flexible conduit 340, and/or allow increased robustness in electrical output signal transfer between the flexible conduit 340 and the sensor 330.

The lower positioning of the flexible conduit 340 is outside of the opening 222 of the electronic device 100 in the embodiment of FIG. 3D. The flexible conduit 340 runs from below the sensor 330, along an edge of the button assembly 310, to below the retainer 224.

The second or distal end of the flexible conduit 340 forms a portion of seal region 309. The distal end of the flexible conduit 340 is disposed below both the static seal 320 and the face seal 318. The distal end of the flexible conduit 340 connects with the system connector 306 through the hot bar connector 322. A seal region 309 is formed by a stack of seals and the distal end of the flexible connector 340. More specifically, a stack is formed of face seal 318, static seal 320, and flexible conduit 340. The hot bar connector 322 connects the distal end of the flexible conduit 340 and the system connector 306.

Figure 4A:
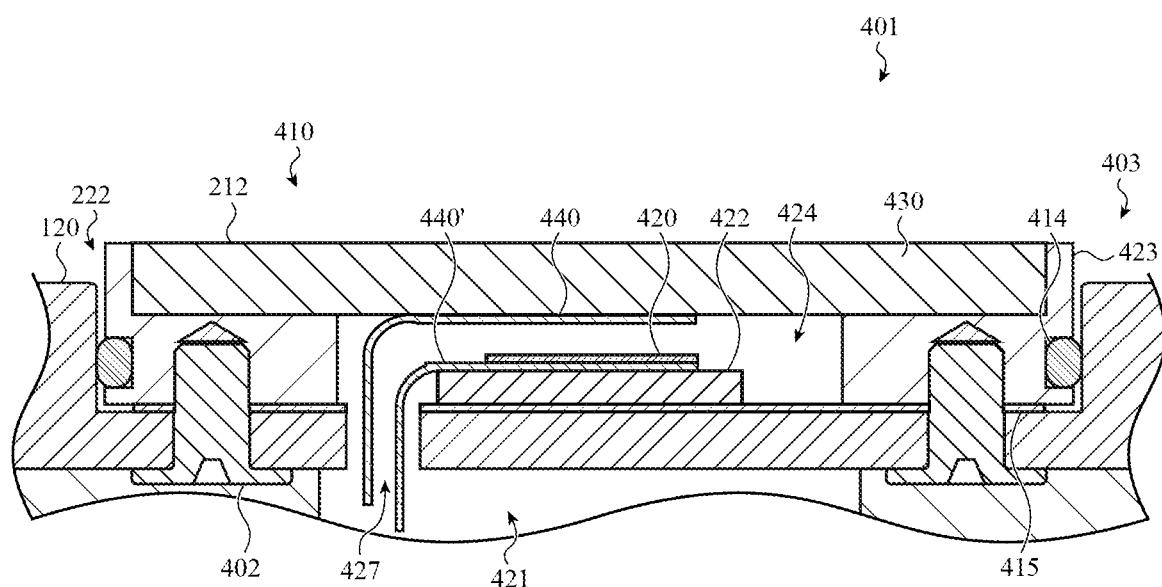
FIG. 4A is a cross-section view of the electronic device of FIG. 1, taken along section B-B in FIG. 1 and showing another embodiment of a biometric sensing system.
Figure 4B:
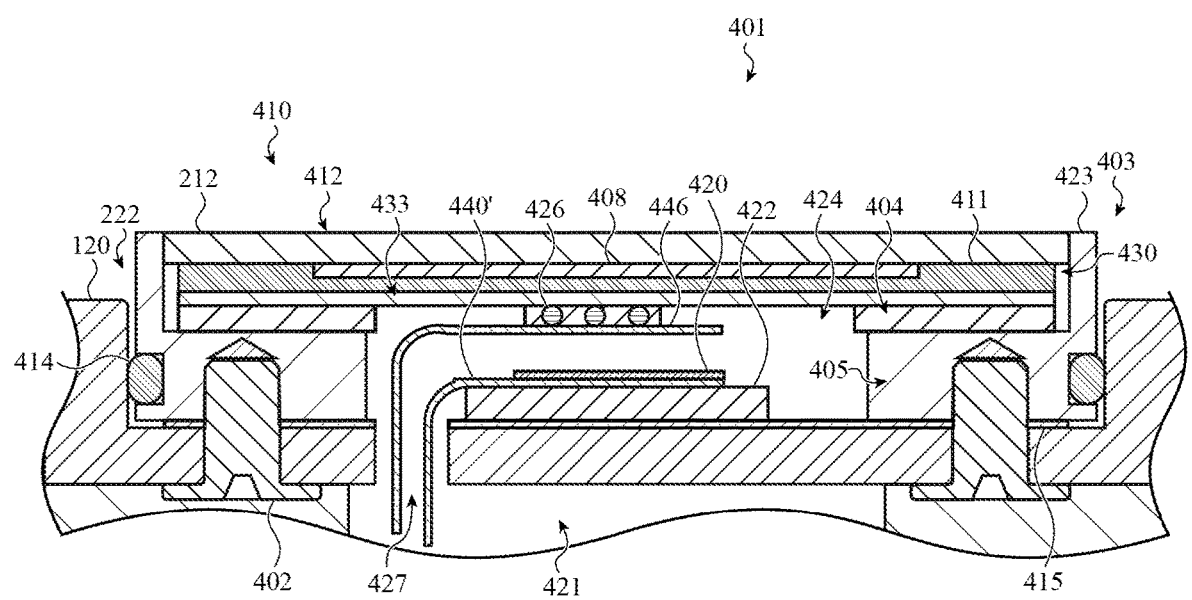
FIG. 4B is a cross-section view of the electronic device of FIG. 1, taken along section B-B in FIG. 1.

FIGS. 4A-B are cross-sections of a biometric button assembly disposed in an opening of an electronic device taken along section B-B of FIG. 1. The biometric button assembly 410 is disposed in an opening of an enclosure 120 of an electronic device 100. In the embodiment of FIG. 4A, the button assembly 410 is stationary and includes a biometric sensor 430. The biometric sensor 430 produces an output signal in response to a user touch to a button input surface 212. The output signal corresponds to a biometric characteristic of a user, such as a fingerprint. A flexible conduit 440 transmits the sensor data to a processor positioned inside the electronic device. The button assembly 410 also includes a touch sensor configured to detect an input to the button input surface 212. The touch sensor includes a lower capacitive plate 420 which produces a signal indicating a user touch to the input surface 212. The button is sealed by an O-ring seal 414 positioned between the button housing 403 and an enclosure 120 of the electronic device.

The button housing 403 of the biometric button assembly 410 includes a biometric sensor 430 configured to detect a biometric characteristic of a user. The biometric sensor 430 is coupled to an input surface 212 disposed on a button housing 403 of the button assembly 410. A flexible conduit 440 is operable to couple the sensor 430 to a processor of the electronic device by transmitting signals from the sensor to the processor. The processor is positioned in an enclosed volume 421 of the enclosure 120 of the electronic device. The flexible conduit 440 passes from an interior volume 424 of the button housing 403 to the enclosed volume 421 of the enclosure 120 by way of passage 427.

The biometric sensor 430 is similar to the sensors 230 and 330 discussed with respect to FIGS. 2-3. An input surface 212 is positioned above the biometric sensor 430. The biometric sensor 430 senses a biometric characteristic of a user, based on user interaction with the input surface 212. In various embodiments, the biometric button assembly may be used to determine a biometric characteristic.

The biometric sensor 430 detects inputs received at the input surface 212 and provides an output signal associated with the detected input, for example, to a processor of the electronic device 100. More specifically, the sensor 430 provides or outputs a signal that is triggered or prompted by user interaction with the input surface 212. For example, the input surface 212 may be an input surface configured to receive a user input which may be sensed by the sensor 430, the sensor 430 sensing or outputting a signal associated with a biometric of a user.

The sensor 430 may be any type of biometric sensor that provides a signal associated with a biometric of a user. For example, the sensor 430 may be a sensor that provides a fingerprint biometric. The fingerprint biometric may be obtained by any means known in the art, to include, without limitation, a capacitive fingerprint sensor, an ultrasonic fingerprint sensor, and an optical fingerprint sensor. For example, the sensor 430 may be a self-capacitive fingerprint sensor made of an array of capacitive sensing elements. Each of the sensing elements measure the capacitance between the sensing element and a particular portion of a user finger touching the input surface 212. The array, or matrix, of capacitive-based sensors may be fine enough to decipher the ridges and grooves of a human fingerprint. The differences in capacitance to the ridges and grooves of a fingerprint may be used to produce a fingerprint.

A flexible conduit 440 receives the output signal of the biometric sensor 430 and provides the output signal to the processor of the electronic device 100. The flexible conduit 440 may pass through passage 427 between the enclosed volume 421 of the electronic device 100 and the interior volume 424 within the button housing 403. A proximal or first end of the flexible conduit 440 is disposed below the sensor 430 and within the interior volume 424. A second or distal end of the flexible conduit 440 is disposed below the button assembly 410 and within the enclosed volume 421.

The button assembly 410 also includes a touch sensor configured to detect an input to the button input surface 212. The touch sensor includes a lower capacitive plate 420, which produces a signal indicating a user touch to the input surface 212. The touch sensor and lower capacitive plate 420 may be configured in any of several ways to detect a touch. Generally, the touch sensor may operate independently from the biometric sensor 430 or in cooperation with the biometric sensor 430.

The touch sensor may operate independently from the biometric sensor 430 by using the lower capacitive plate 420 to detect a change in capacitance with a capacitive element positioned above the lower capacitive plate 420. The lower capacitive plate 420 may detect a capacitive virtual ground effect caused by a user touch (or near touch) to the input surface 212. The measured change in capacitance is identified by the lower capacitive plate 420, producing an output signal from the lower capacitive plate 420. The lower capacitive plate 420 output signal is transmitted to the processor of the electronic device by flexible conduit 440' as will be described in more detail with respect to FIG. 4B, the input surface 212 may displace and/or deflect relative to the lower capacitive plate 420. Such a change in relative distance causes a change in capacitance between the user finger and the lower capacitive plate 420, which may be equated to a touch on the input surface 212.

The touch sensor may operate in cooperation with the biometric sensor 430. For example, if the biometric sensor 430 is a capacitive-based sensor, then a capacitor of the biometric sensor 430 and the lower capacitive plate 420 may form a two plate capacitive gap sensor. The capacitor of the biometric sensor 430 and the lower capacitive plate 420 may also cooperate to form a mutual capacitance system. A change in capacitance will occur when the distance between the biometric sensor 430 and the lower capacitive plate 420 changes, either due to movement or deflection of the input surface 212.

The output of the lower capacitive plate 420 of the touch sensor is provided to flexible conduit 440'. Flexible conduit 440' receives the output signal of the lower capacitive plate 420 of the touch sensor and provides the output signal to the processor of the electronic device 100. The flexible conduit 440' passes through passage 427 between the interior volume 424 of the button housing 403 and the enclosed volume 421 of the electronic device 100. A proximal or first end of the flexible conduit 440' is disposed below the lower capacitive plate 420 and within the interior volume 424. A second or distal end of the flexible conduit 440' is disposed below the button assembly 410 and within the enclosed volume 421.

Both the lower capacitive plate 420 and the flexible conduit 440' are mounted to shelf 422. The shelf 422 may be attached to the button housing 423 by a laser weld or other joining technique. The shelf 422 may be separated from the enclosure 120 by a gap and/or may be separated by the isolation sheet 415.

An electrical isolation sheet 415 is positioned against a housing shelf of the button housing 403 such that when the button assembly 410 is installed in an electronic device, the button assembly 410 is electrically isolated from the electronic device. In one embodiment, the electrical isolation sheet 415 additionally or alternatively functions as a seal to inhibit the entry of contaminants into the electronic device and/or the button housing. For example, the electrical isolation sheet 415 may be a gasket made of rubber, plastic, or another suitable material.

The button assembly 410 engages an opening of an electronic device 100. The electronic device 100 includes an enclosure 120 which defines an enclosed volume 421. An opening 222 may be connected to the enclosed volume 421 by way of passage 427. The enclosed volume 421 of the electronic device 100 may include components such as a processor, data storage memory, and the like. An O-ring seal 414 is fitted between the button assembly 410 and the opening 222 in order to prevent or restrict the entry of contaminants into the enclosed volume 421 and/or the opening 222.

The button assembly 410 further includes a housing wall 423 extending from a perimeter edge of the input surface 212. The input surface 212, housing wall 423, and housing shelf 405 define the button housing 403. The housing shelf defines a lower end of the button assembly. The housing wall 423 may comprise a trim portion. The trim portion may be configured with characteristics similar to that of the adjacent portion of the electronic device 100. For example, the trim portion may be of the same color, texture, and/or material composition as the adjacent portion of the electronic device 100. The housing wall 423 is configured with a perimeter channel to receive the O-ring seal 414.

The O-ring seal 414 contacts the housing wall 423 of the biometric button assembly 410 and the opening 222 of the enclosure 120 such that contaminants are inhibited from entering the enclosure 120 and the interior volume 424 of the button housing 403. The O-ring seal 414 is disposed between the housing wall 423 and the opening 222. The O-ring seal 414 restricts and/or prevents contaminants from entering the enclosed volume of the electronic device 100 by way of passage 427. The O-ring seal also restricts and/or prevents contaminants from entering the interior volume of the button assembly 410. More specifically, the O-ring seal restricts and/or prevents contaminants that may enter a gap between the housing wall 423 and opening 222 and thus enter one or both of the enclosed volume 421 of the electronic device 100 and the interior volume 424 of the button assembly 410.

The O-ring seal 414 may be manufactured of any known sealing material. For example, the O-ring seal 414 may be formed of materials such as rubber and elastomeric materials. In one embodiment, the O-ring seal 414 forms a water-tight seal. "Water-tight seal," as used herein, may be used to refer to a seal that prevents water entering an area of interest.

Button housing 403 is attached to electronic device 100 by way of fasteners 402. In the embodiment depicted, the fasteners 402 are screws. Other retaining means are possible, to include press fits, clamps, and adhesives. The fasteners 402 are fixed to the electronic device 100 such that a portion of each fastener extends into the button housing 403. More specifically, the fastener engages the housing shelf 405 of the button housing 403. In one embodiment, fasteners 402 are made of a non-conductive material, such as a resin or a plastic. In another embodiment, the fasteners 402 are of a metallic material.

In one embodiment, a seal is positioned between the button housing and a surface of the opening of the enclosure. The seal inhibits the entry of contaminants into the electronic device. In such an embodiment, the fasteners 402 attaching the button housing 403 to the enclosure place the seal in compression. In one embodiment, the seal is the electrical isolation sheet 415.

With attention to FIG. 4B, more detail of the biometric sensing assembly 410 is provided. The biometric sensor 430 is depicted with components of sensing elements 408 and sensor die 411. The sensing elements 408 are the active sensing components of a particular biometric sensor 430. For example, as discussed with respect to FIGS. 3A-B, if the biometric sensor 430 is a multi-capacitor sensor, the sensing elements 408 are the capacitive plate elements that, together, form a matrix of capacitive sensing elements. The sensor die 411 is shaped or configured to snuggly fit or securely retain the sensing elements 408. In one embodiment, the sensor die 411 forms an interference fit with the sensing elements 408.

The sensor die 411 retains the sensing elements 408 in a substantially planar configuration. Sensor overmold 433 is disposed below sensor die 411. In some embodiments, sensor overmold 433 may at least partially hold or encircle sensor die 411.

An input member 412 may be disposed above biometric sensor 430 and extend across the top surface of the button housing 403. The input member 412 may be capable of deflecting, or otherwise moving, relative to the lower capacitive plate 420. The input member 412 may move or deflect in response to a user touching or pressing on the input surface 212. In one embodiment, the input member 412 is a cover glass, such as sapphire.

In one embodiment, the input member 412 includes a first or upper layer that matches the housing wall 423. For example, the upper layer of the input member 412 may be of the same material, or appear to be of the same material, as the housing wall 423. In one embodiment, the input member 412 includes a second layer positioned below the first layer, the first layer being a cover glass, such as a sapphire cover glass.

System interconnects 426 are disposed below the sensor overmold 433. The system interconnects 426 electrically connect the signals output from the sensing elements 408 to the flexible conduit 440. The flexible conduit 440 bends downward into the interior volume by way of passage 427, ultimately connecting to a processor of the electronic device 100.

The system interconnects 426 and the flexible conduit 440 are positioned within or in contact with a compressible layer 404. The compressible layer 404 compresses to allow slight deflection and/or displacement of the input member 412. Stated another way, the compressible layer 404 is compressible, thereby enabling the input member 412 to slightly displace or bend toward the interior volume 424.

In one embodiment, the compressible layer 404 is a heat activated (HAF) silicon sandwich. The HAF silicon sandwich is a stack of the following five elements: heat activated film, polyimide (PI), silicon, heat activated film and the flexible conduit 440. Other configurations of the aforementioned elements are possible in other embodiments, to include, for example, heat activated film, PI, then flexible conduit, and any other combination or sequence of the elements. In other embodiments, the compressible layer 404 is made of any combination of the above materials. System interconnects 426 may be positioned within all or a portion of the compressible layer 404.

Figure 4C:
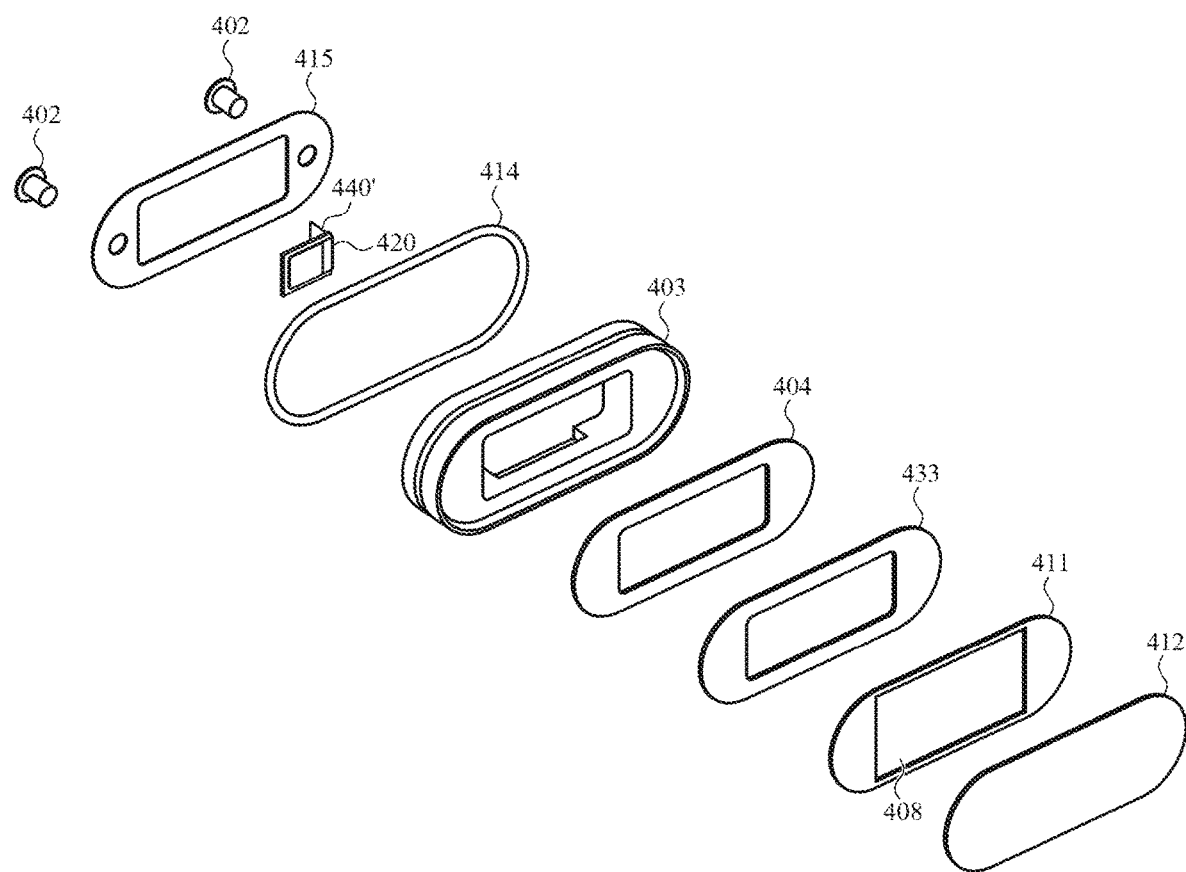
FIG. 4C is an exploded view of portions of the embodiment of a biometric sensing system of FIG. 4B.

FIG. 4C is a sample assembly drawing of portions of the embodiment of a biometric sensing system 401 of FIG. 4B. The stack of components will be described in a descending direction from the exterior of the button assembly downward, and from right to left in FIG. 4C. Generally, the components of the biometric sensing system 401 interconnect.

Input member 412, which may be a sapphire cover glass, fits over sensing elements 408 as fitted to sensor die 411. The assembly of sensor die 411 and sensing elements 408 then fit to sensor overmold 433. Sensor overmold 433 is in turn disposed on compressible layer 404, which in turn fits to a housing shelf of button housing 403. O-ring seal 414 fits around a perimeter of button housing 403. Lower capacitive plate 420, with a portion of flexible conduit 440', fits below the button housing 403. Next, electrical isolation sheet 415 engages a lower portion of the button housing 403. Lastly, fasteners 402 secure the button housing 403 to the enclosure 120 of the electronic device 100.

Figure 4D:
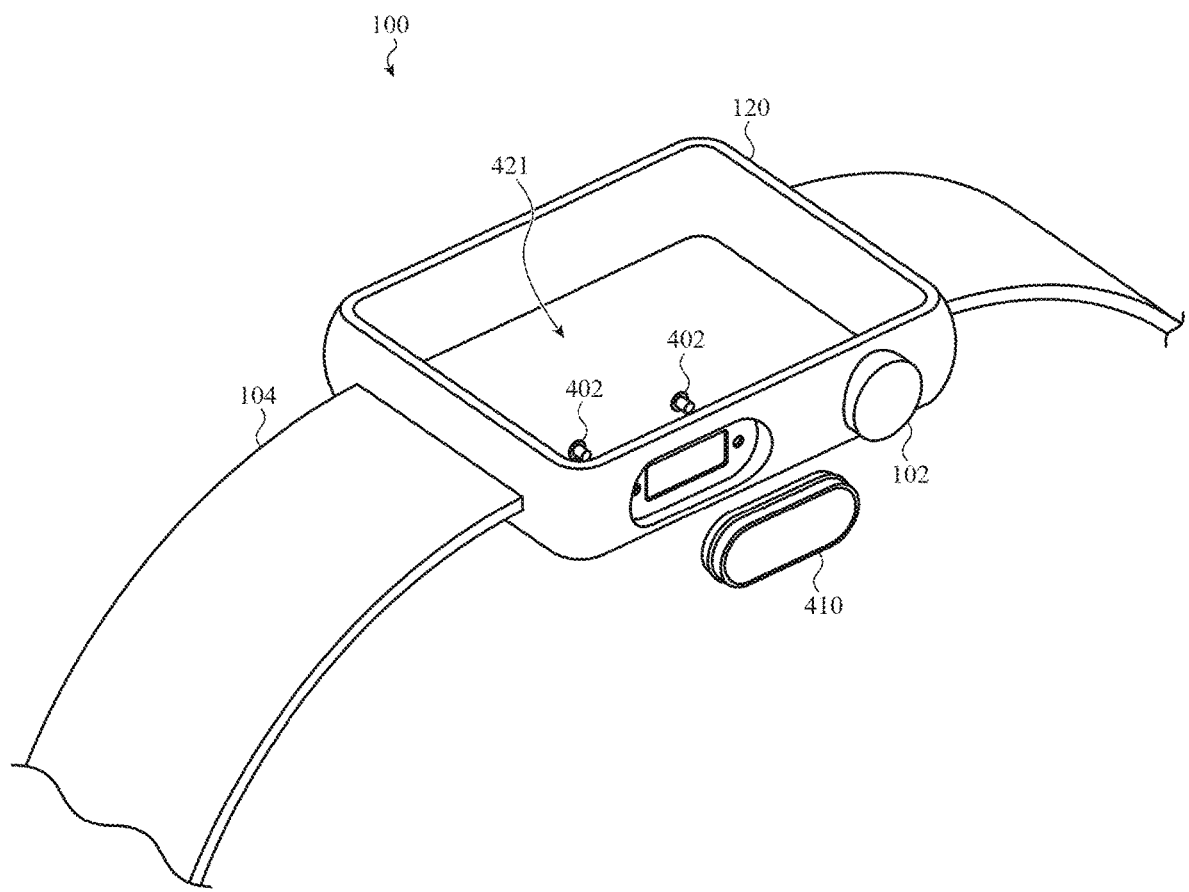
FIG. 4D is an exploded view of portions of the embodiment of a biometric sensing system of FIG. 4C.

FIG. 4D is another sample assembly drawing of the completed button assembly 410 fitted to the electronic device 100 by way of fasteners 402. The fasteners 402 pass through the enclosure 120 to secure the button assembly 410 to the enclosure 120. Other configurations of securing the button assembly 410 to the enclosure 120 are possible, to include use of other attachment devices, such as adhesives. In one embodiment, the button assembly is secured to the enclosure 120 by an interference fit.

Figure 4E:
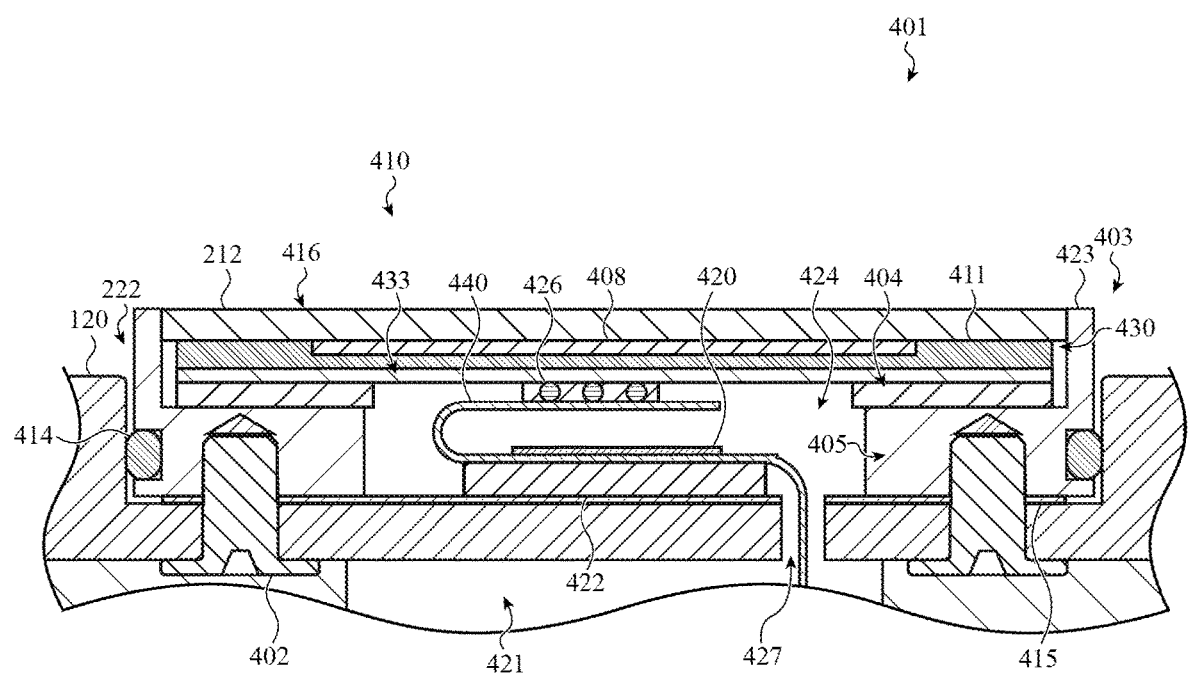
FIG. 4E is a cross-section view of the electronic device of FIG. 1, taken along section B-B in FIG. 1 and showing another embodiment of a biometric sensing system 401.

FIG. 4E is a sample cross-section view of the electronic device 100 of FIG. 1, taken along section B-B in FIG. 1 and showing another embodiment of a biometric sensing system 401. The embodiment of FIG. 4E is similar to the embodiment of FIG. 4B, except that the configuration of the flexible conduit 440 is altered. Specifically, the flexible conduit 440 travels in a serpentine manner from below the sensor overmold 433 (the same starting configuration as the flexible conduit 440 of FIG. 4B), to below the lower capacitive plate 420 (the same location as flexible conduit 440' of FIG. 4B), then bending downward into the interior volume 42, ultimately connecting to a processor of the electronic device 100.

Figure 5:
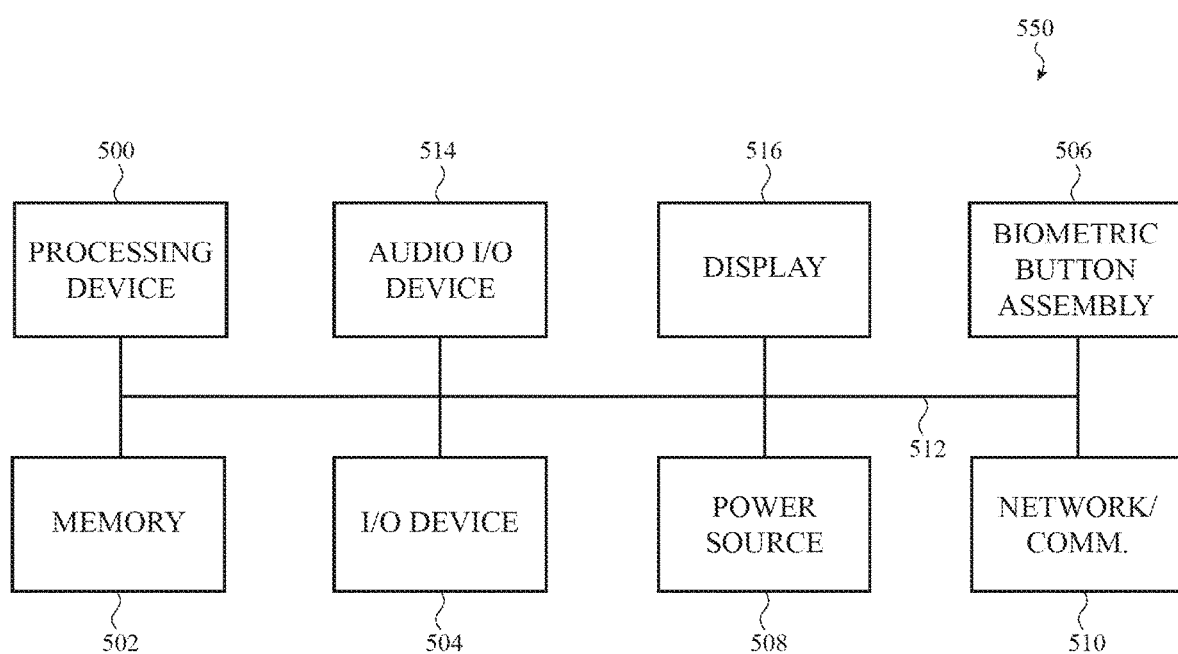
FIG. 5 is an illustrative block diagram of an electronic device such as described herein.

FIG. 5 is an illustrative block diagram 550 of an electronic device 100 as described herein. The electronic device can include a display 516, one or more processing units 500, memory 502, one or more input/output (I/O) devices 504, one or more button assemblies 506, a power source 508, and a network communications interface 510.

The display 516 may provide an image or graphical output (e.g., computer-generated image data) for the electronic device. The display may also provide an input surface for one or more input devices, such as, for example, a touch sensing device and/or a fingerprint sensor. The display 516 may be substantially any size and may be positioned substantially anywhere on the electronic device.

The processing unit 500 can control some or all of the operations of the electronic device. The processing unit 500 can communicate, either directly or indirectly, with substantially all of the components of the electronic device. For example, a system bus or signal line 512 or other communication mechanisms (e.g., electronic connectors) can provide communication between the processing unit(s) 500, the memory 502, the I/O device(s) 504, the button assemblies 506, the power source 508, and/or the network communications interface 510. The one or more processing units 500 can be implemented as any electronic device capable of processing, receiving, or transmitting data or instructions. For example, the processing unit(s) 500 can each be a microprocessor, a central processing unit, an application-specific integrated circuit, a field-programmable gate array, a digital signal processor, an analog circuit, a digital circuit, or a combination of such devices. The processor may be a single-thread or multi-thread processor. The processor may be a single-core or multi-core processor.

Accordingly, as described herein, the phrase "processing unit" or, more generally, "processor" refers to a hardware-implemented data processing unit or circuit physically structured to execute specific transformations of data, including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

The memory 502 can store electronic data that can be used by the electronic device. For example, a memory can store electrical data or content such as, for example, audio and video files, documents and applications, device settings and user preferences, timing signals, signals received from the one or more sensors, one or more pattern recognition algorithms, data structures or databases, and so on. The memory 502 can be configured as any type of memory. By way of example only, the memory can be implemented as random access memory, read-only memory, flash memory, removable memory, or other types of storage elements, or combinations of such devices.

The one or more I/O devices 504 can transmit and/or receive data to and from a user or another electronic device. The I/O device(s) 504 can include a display, a touch or force sensing input surface such as a trackpad, one or more buttons, one or more microphones or speakers, one or more ports such as a microphone port, one or more accelerometers for tap sensing, one or more optical sensors for proximity sensing, and/or a keyboard.

The electronic device may also include one or more button assemblies 506 positioned substantially anywhere on the electronic device and configured to receive inputs and transmit input signals to the electronic device, as described above with respect to FIGS. 1-4. In various embodiments, the button assembly may be used to control various functions and components of the electronic device, such as a graphical output of a display 516, an audio output of the audio I/O device 514, powering the electronic device on and off, and the like. A button assembly 506 may be configured, for example, as a power button, a key of a keyboard, a control button (e.g., volume control), a home button, a watch crown, or the like. In one embodiment, a graphical output of the display 516 is responsive to the input provided to the button assembly.

The power source 508 can be implemented with any device capable of providing energy to the electronic device. For example, the power source 508 can be one or more batteries or rechargeable batteries, or a connection cable that connects the remote control device to another power source such as a wall outlet.

The network communication interface 510 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

It should be noted that FIG. 5 is for illustrative purposes only. In other examples, an electronic device may include fewer or more components than those shown in FIG. 5. Additionally or alternatively, the electronic device can be included in a system and one or more components shown in FIG. 5 are separate from the electronic device but included in the system. For example, an electronic device may be operatively connected to, or in communication with a separate display. As another example, one or more applications can be stored in a memory separate from the wearable electronic device. The processing unit in the electronic device can be operatively connected to and in communication with the separate display and/or memory.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINs), touch gestures, or other authentication methods, alone or in combination, known to those of skill in the art. In another example, users can select to remove, disable, or restrict access to certain health-related applications collecting users' personal health or fitness data.

What is claimed is:

1. An electronic device comprising:
   an enclosure having a sidewall, wherein the enclosure defines an enclosed volume and an opening is defined in the sidewall;
   a bracket positioned within the opening;
   a printed circuit board disposed on the bracket; and
   a button assembly positioned within the opening, the button assembly including:
      an input member having an input surface; and
      a dome switch disposed on the printed circuit board, the dome switch positioned between the printed circuit board and the input surface, the dome switch configured to compress in response to a press on the input surface.

2. The electronic device of claim 1, wherein the button assembly further comprises:
   a plunger positioned between the input surface and the dome switch, the plunger being operable to compress the dome switch in response to the press on the input surface; and
   a retainer defining an aperture housing the plunger;
   wherein the retainer defines a sealing surface of the button assembly.

3. The electronic device of claim 2, wherein the button assembly comprises a plunger seal positioned between the plunger and the retainer.

4. The electronic device of claim 2, wherein the retainer comprises a lower surface forming the sealing surface of the button assembly.

5. The electronic device of claim 2, wherein the plunger is axially aligned within the button assembly.

6. The electronic device of claim 2, wherein the plunger comprises a groove to receive a plunger seal.

7. The electronic device of claim 2, wherein the plunger is attached to an upper stiffener of the button assembly.

8. The electronic device of claim 1, wherein the bracket comprises a rigid component providing structural support to the printed circuit board and the dome switch, wherein the printed circuit board is positioned between the dome switch and the bracket.

9. The electronic device of claim 1, wherein the bracket is disposed on a shelf within the opening.

10. The electronic device of claim 1, wherein the button assembly comprises a biometric sensor.

11. An electronic device comprising:
    an enclosure having a sidewall, wherein the enclosure defines an enclosed volume and an opening is defined in the sidewall;
    a processor disposed in the enclosed volume;
    a display positioned within the enclosure and operably coupled to the processor;
    a button assembly disposed within the opening, the button assembly comprising:
       a button housing;
       an input member defining an input surface;
       a biometric sensor positioned internal to the input member and configured to produce an output signal in response to a touch on the input surface, the output signal corresponding to a biometric characteristic of a user;
       a sensing element configured to detect the biometric characteristic;
       a sensor die configured to retain the sensing element;
       an encapsulant enclosing the sensor die and the sensing element;
       a stiffener disposed against the encapsulant, the stiffener including a rigid material; and
       a plunger configured to contact the stiffener when the button assembly is depressed.

12. The electronic device of claim 11, further comprising a flexible conduit configured to conform to the button housing.

13. The electronic device of claim 12, wherein the flexible conduit comprises a connection to a system connector through a hot bar connector.

14. The electronic device of claim 13, wherein the hot bar connector comprises a permanent electro-mechanical connection.

15. The electronic device of claim 12, further comprising a system interconnect electrically connecting the flexible conduit to the processor.

16. A fingerprint sensing system for a wearable device comprising:
    an enclosure defining an enclosed volume and an opening along an exterior surface;
    a processor disposed in the enclosed volume;
    a button assembly positioned in the opening and defining an input surface, the button assembly comprising:
       a fingerprint sensor positioned inward from the input surface; and
       a retainer positioned inward from the input surface and defining an axial aperture and a sealing surface;
       a plunger configured to engage the retainer in the axial aperture;
    a seal region discrete from the retainer and disposed between the sealing surface of the retainer and a surface of the opening, the seal region comprising a face seal and a static seal; and
    a flexible conduit electrically connecting the fingerprint sensor to the processor;
    wherein a portion of the flexible conduit is sandwiched between the seal region and the sealing surface of the retainer or between the seal region and the surface of the opening.

17. The fingerprint sensing system of claim 16, wherein the flexible conduit extends through a passage extending from the opening to the enclosed volume.

18. The fingerprint sensing system of claim 16, wherein the flexible conduit is coupled to a second flexible conduit that extends through a passage extending from the opening to the enclosed volume.

19. The fingerprint sensing system of claim 16, wherein the fingerprint sensor is further configured to detect a capacitance of an array of capacitive sensing elements or a change in capacitance of the array.

20. The fingerprint sensing system of claim 16, wherein the button assembly further comprises a dome switch disposed inward from the retainer, and the dome switch is compressible in response to a press on the input surface.

* * * * *